(12) United States Patent
Dair et al.

(10) Patent No.: US 6,874,953 B2
(45) Date of Patent: Apr. 5, 2005

(54) METHODS AND APPARATUS FOR FIBER-OPTIC MODULES WITH SHIELDED HOUSINGS/COVERS WITH FINGERS

(75) Inventors: Edwin Dair, Los Angeles, CA (US); Wenbin Jiang, Thousand Oaks, CA (US); Cheng Ping Wei, Gilbert, AZ (US); Yong Peng Sim, Singapore (SG)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/618,234

(22) Filed: Jul. 11, 2003

(65) Prior Publication Data

US 2004/0037517 A1 Feb. 26, 2004

Related U.S. Application Data

(62) Division of application No. 09/782,875, filed on Feb. 12, 2001, now Pat. No. 6,659,655.

(51) Int. Cl.$^7$ ................................................ G02B 6/36
(52) U.S. Cl. ........................................ 385/92; 439/607
(58) Field of Search ............................. 385/92; 439/607

(56) References Cited

U.S. PATENT DOCUMENTS

| | | |
|---|---|---|
| 1,661,535 A | 3/1928 | Haddock |
| 1,765,443 A | 6/1930 | Peterson |
| 1,875,968 A | 9/1932 | Weeber |
| 1,955,648 A | 4/1934 | Nickler |
| 2,062,256 A | 11/1936 | Del Camp |
| 2,065,651 A | 12/1936 | Burton |
| 2,133,789 A | 10/1938 | Pool |
| 2,169,962 A | 8/1939 | Del Camp |
| 2,219,941 A | 10/1940 | Rochow |
| 2,317,813 A | 4/1943 | Schoenborn |
| 2,321,587 A | 6/1943 | Davie et al. |
| 2,349,440 A | 5/1944 | Lavoie |
| 2,447,380 A | 8/1948 | Wenger |
| 2,477,267 A | 7/1949 | Robinson |
| 2,488,710 A | 11/1949 | Cooper |
| 2,520,725 A | 8/1950 | Judd |
| 2,531,911 A | 11/1950 | Johnson |
| 2,604,507 A | 7/1952 | Tyson |
| 2,629,764 A | 2/1953 | Wiley |
| 2,704,301 A | 3/1955 | Feketics |
| 2,753,390 A | 7/1956 | Feketics |
| 2,762,990 A | 9/1956 | Klelenstiin |
| 2,783,295 A | 2/1957 | Ewing |
| 2,790,153 A | 4/1957 | Arson |

(Continued)

OTHER PUBLICATIONS

Martin, R.E., Eng. C. Electrical Interference in Electrical Systems: It's Avoidance within High–Voltage Substations and Elsewhere, Research Studies Press, Forest Grove, Oregon, 1979, pp. 22–25, 138.

Ricketts, L.W., Bridges, J.E., Miletta, J. EMP Radiation and Protective Techniques, John Wiley & Sons, Inc., New York, NY, 1976, pp. 122–272.

*Primary Examiner*—Hae Moon Hyeon
(74) *Attorney, Agent, or Firm*—Allen, Dyer, Doppelt, Milbrath & Gilchrist, P.A.

(57) ABSTRACT

A fiber-optic module having a housing/shielding unit and a module chassis frame having optical, electrical and electro-optical components. The housing/shielding unit functions both as a protective outer housing and an electromagnetic shield. The housing/shielding unit includes forward fingers for a flush mounting in one embodiment and backward fingers for an extended mounting in another embodiment. The fingers can contact a bezel, faceplate or wall of host system to ground the housing/shielding unit to a chassis ground. The module chassis frame may be formed of a conductive material and grounded as well through a host system faceplate or otherwise to the chassis ground. A transmit ground for transmitter components and a receive ground for receiver components are isolated from the chassis ground.

14 Claims, 31 Drawing Sheets

U.S. PATENT DOCUMENTS

| | | |
|---|---|---|
| 2,793,245 A | 5/1957 | Dunn |
| 2,800,698 A | 7/1957 | Wood |
| 2,825,042 A | 2/1958 | Tollefson et al. |
| 2,844,644 A | 7/1958 | Boule, Jr. |
| 2,853,541 A | 9/1958 | Lindgren |
| 2,872,139 A | 2/1959 | Bedford, Jr. |
| 2,876,275 A | 3/1959 | Schulz |
| 2,974,183 A | 3/1961 | Kes et al. |
| 2,978,531 A | 4/1961 | Appleman |
| 3,019,281 A | 1/1962 | Hartwell |
| 3,026,367 A | 3/1962 | Hartwell |
| 3,052,821 A | 9/1962 | Scoville |
| 3,056,942 A | 10/1962 | Carbaugh et al. |
| 3,099,506 A | 7/1963 | Tuchel |
| 3,128,138 A | 4/1964 | Noschese |
| 3,217,085 A | 11/1965 | Lindgren |
| 3,234,318 A | 2/1966 | Lieshout et al. |
| 3,270,252 A | 8/1966 | Iversen |
| 3,277,230 A | 10/1966 | Stickney et al. |
| 3,300,687 A | 1/1967 | Hennessey |
| 3,304,360 A | 2/1967 | Hadley et al. |
| 3,305,623 A | 2/1967 | Bakker et al. |
| 3,311,792 A | 3/1967 | Scoville |
| 3,341,102 A | 3/1967 | Stephens et al. |
| 3,340,587 A | 9/1967 | Beyer |
| 3,366,918 A | 1/1968 | Johnson et al. |
| 3,368,150 A | 2/1968 | Worcester |
| 3,370,140 A | 2/1968 | Betts |
| 3,385,970 A | 5/1968 | Coffin, Jr. et al. |
| 3,407,261 A | 10/1968 | Donath et al. |
| 3,413,406 A | 11/1968 | Plummer |
| 3,426,140 A | 2/1969 | Templeton |
| 3,436,467 A | 4/1969 | Smith, Jr. |
| 3,423,670 A | 7/1969 | Parker et al. |
| 3,474,385 A | 10/1969 | Cefarelli et al. |
| 3,475,657 A | 10/1969 | Knowles |
| 3,487,186 A | 12/1969 | Johnson et al. |
| 3,504,095 A | 3/1970 | Roberson et al. |
| 3,506,877 A | 4/1970 | Owen |
| 3,524,137 A | 8/1970 | Redfield et al. |
| 3,535,676 A | 10/1970 | Schultz, Sr. |
| 3,536,820 A | 10/1970 | Stevens et al. |
| 3,546,359 A | 12/1970 | Ciccarelli |
| 3,555,168 A | 1/1971 | Frykberg |
| 3,566,336 A | 2/1971 | Johnson et al. |
| 3,569,915 A | 3/1971 | Sorensen et al. |
| 3,594,490 A | 7/1971 | Mitchell et al. |
| 3,617,611 A | 11/1971 | Kuether |
| 3,627,900 A | 12/1971 | Robinson |
| 3,659,251 A | 4/1972 | Fish |
| 3,670,292 A | 7/1972 | Tracy |
| 3,721,746 A | 3/1973 | Knappenberger |
| 3,784,233 A | 1/1974 | Hilbert |
| 3,816,911 A | 6/1974 | Knappenberger |
| 3,825,874 A | 7/1974 | Peverill |
| 3,852,700 A | 12/1974 | Haws |
| 3,854,107 A | 12/1974 | Tucto et al. |
| 3,864,011 A | 2/1975 | Huber |
| 3,871,735 A | 3/1975 | Herrmann, Jr. |
| 3,878,397 A | 4/1975 | Robb et al. |
| 3,883,715 A | 5/1975 | Gebo |
| 3,885,084 A | 5/1975 | Kaiserswerth et al. |
| 3,889,043 A | 6/1975 | Ducros |
| 3,904,810 A | 9/1975 | Kraus |
| 3,907,396 A | 9/1975 | Huber |
| 3,909,726 A | 9/1975 | Dobrovolny et al. |
| 3,914,001 A | 10/1975 | Nelson et al. |
| 3,922,056 A | 11/1975 | Murawski et al. |
| 3,944,317 A | 3/1976 | Oberdiear |
| 3,952,152 A | 4/1976 | Lill et al. |
| 3,962,550 A | 6/1976 | Kaiserswerth |
| 4,018,989 A | 4/1977 | Snyder et al. |
| 4,020,430 A | 4/1977 | Vander Heyden |
| 4,037,009 A | 7/1977 | Severinsen |
| 4,053,199 A | 10/1977 | Hollyday et al. |
| 4,110,552 A | 8/1978 | Lombardi |
| 4,111,513 A | 9/1978 | Thurston et al. |
| 4,115,655 A | 9/1978 | Prentice |
| 4,138,711 A | 2/1979 | Bremenour et al. |
| 4,148,543 A | 4/1979 | Shores |
| 4,149,027 A | 4/1979 | Asher et al. |
| 4,176,897 A | 12/1979 | Cameron |
| 4,215,796 A | 8/1980 | Johnson et al. |
| 4,217,019 A | 8/1980 | Cameron |
| 4,218,578 A | 8/1980 | Olschewski et al. |
| 4,226,491 A | 10/1980 | Kazama et al. |
| 4,227,037 A | 10/1980 | Layton |
| 4,255,015 A | 3/1981 | Adams et al. |
| 4,265,506 A | 5/1981 | Holyday |
| 4,300,016 A | 11/1981 | Bergeron et al. |
| 4,325,103 A | 4/1982 | Ito et al. |
| 4,331,285 A | 5/1982 | Gottwals |
| 4,334,259 A | 6/1982 | Edwards |
| 4,337,989 A | 7/1982 | Asick et al. |
| 4,345,808 A | 8/1982 | Ingham |
| 4,380,359 A | 4/1983 | Hoffman et al. |
| 4,381,129 A | 4/1983 | Krenz |
| 4,384,165 A | 5/1983 | Loving, Jr. et al. |
| 4,384,368 A | 5/1983 | Reosenfeldt et al. |
| 4,386,814 A | 6/1983 | Asick |
| 4,389,080 A | 6/1983 | Clark et al. |
| 4,396,795 A | 8/1983 | Bogner |
| 4,398,780 A | 8/1983 | Novotny et al. |
| 4,399,317 A | 8/1983 | Van Dyk, Jr. |
| 4,399,318 A | 8/1983 | Waters |
| 4,399,487 A | 8/1983 | Neumann |
| 4,401,355 A | 8/1983 | Young |
| 4,404,617 A | 9/1983 | Ohyama et al. |
| 4,406,514 A | 9/1983 | Hillegonds et al. |
| 4,420,201 A | 12/1983 | Stephenson |
| 4,427,879 A | 1/1984 | Becher et al. |
| 4,447,492 A | 5/1984 | McKaveney |
| 4,457,575 A | 7/1984 | Davis et al. |
| 4,457,576 A | 7/1984 | Cosmos et al. |
| 4,470,660 A | 9/1984 | Hillegonds et al. |
| 4,486,059 A | 12/1984 | Deyoung |
| 4,490,002 A | 12/1984 | Fowler |
| 4,491,981 A | 1/1985 | Weller et al. |
| 4,521,062 A | 1/1985 | Kurbikoff et al. |
| 4,500,159 A | 2/1985 | Briones et al. |
| 4,506,937 A | 3/1985 | Cosmos et al. |
| 4,512,618 A | 4/1985 | Kumar |
| 4,514,586 A | 4/1985 | Waggoner |
| 4,516,815 A | 5/1985 | Venable et al. |
| 4,518,209 A | 5/1985 | Negley |
| 4,531,176 A | 7/1985 | Beecher, II |
| 4,537,458 A | 8/1985 | Worth |
| 4,550,960 A | 11/1985 | Asick et al. |
| 4,554,400 A | 11/1985 | Schmalzl |
| 4,567,317 A | 1/1986 | Ehrlich et al. |
| 4,571,012 A | 2/1986 | Bassler et al. |
| 4,572,921 A | 2/1986 | May et al. |
| 4,595,839 A | 6/1986 | Braun et al. |
| 4,596,048 A | 6/1986 | Dunki-Jacobs |
| 4,601,527 A | 7/1986 | Lemke |
| 4,602,164 A | 7/1986 | Gore, III et al. |
| 4,609,104 A | 9/1986 | Kasper et al. |
| 4,614,836 A | 9/1986 | Carpenter et al. |
| 4,623,752 A | 11/1986 | Steen et al. |
| 4,647,148 A | 3/1987 | Katagiri |
| 4,659,869 A | 4/1987 | Busby |

| | | | | | |
|---|---|---|---|---|---|
| 4,684,762 A | 8/1987 | Gladfelter | 5,221,212 A | 6/1993 | Davis |
| 4,737,008 A | 4/1988 | Ohyama et al. | 5,233,507 A | 8/1993 | Günther et al. |
| 4,756,593 A | 7/1988 | Koakutsu et al. | 5,233,676 A | 8/1993 | Yonemura et al. |
| 4,767,345 A | 8/1988 | Gutter et al. | 5,250,751 A | 10/1993 | Yamaguchi |
| 4,780,570 A | 10/1988 | Chuck | 5,253,320 A | 10/1993 | Takahashi et al. |
| 4,803,306 A | 2/1989 | Malmquist | 5,262,923 A | 11/1993 | Batta et al. |
| 4,808,115 A | 2/1989 | Norton et al. | 5,271,056 A | 12/1993 | Pesola et al. |
| 4,812,137 A | 3/1989 | Wilson et al. | 5,280,191 A | 1/1994 | Chang |
| 4,820,885 A | 4/1989 | Lindsay | 5,288,244 A | 2/1994 | Lien |
| 4,823,235 A | 4/1989 | Suzuki et al. | 5,288,247 A | 2/1994 | Kaufman |
| 4,829,432 A | 5/1989 | Hershberger et al. | 5,289,347 A | 2/1994 | McCarthy et al. |
| 4,840,451 A | 6/1989 | Sampson et al. | 5,304,069 A | 4/1994 | Brunker et al. |
| 4,842,555 A | 6/1989 | Cosmos et al. | 5,309,315 A | 5/1994 | Naedel et al. |
| 4,854,890 A | 8/1989 | Nishimura | 5,312,273 A | 5/1994 | Andre et al. |
| 4,857,668 A | 8/1989 | Buonanno | 5,313,016 A | 5/1994 | Brusati et al. |
| 4,858,890 A | 8/1989 | Nishimura | 5,317,105 A | 5/1994 | Weber |
| 4,861,134 A | 8/1989 | Alameel et al. | 5,323,298 A | 6/1994 | Shatas et al. |
| 4,863,233 A | 9/1989 | Nienaber et al. | 5,325,453 A | 6/1994 | Drissler |
| 4,866,213 A | 9/1989 | Lindsay | 5,329,428 A | 7/1994 | Block et al. |
| 4,868,716 A | 9/1989 | Taylor et al. | 5,285,512 A | 8/1994 | Duncan et al. |
| 4,872,212 A | 10/1989 | Roos et al. | 5,337,396 A | 8/1994 | Chen et al. |
| 4,878,858 A | 11/1989 | Dechelette | 5,343,361 A | 8/1994 | Rudy, Jr. et al. |
| 4,886,463 A | 12/1989 | Scott et al. | 5,354,951 A | 10/1994 | Lange, Sr. et al. |
| 4,889,502 A | 12/1989 | Althouse et al. | 5,356,300 A | 10/1994 | Costello et al. |
| 4,899,254 A | 2/1990 | Ferchau et al. | 5,357,402 A | 10/1994 | Anahalt |
| 4,902,606 A | 2/1990 | Patraw | 5,366,664 A | 11/1994 | Varadan et al. |
| 4,903,402 A | 2/1990 | Norton et al. | 5,372,515 A | 12/1994 | Miller et al. |
| 4,906,208 A | 3/1990 | Nakamura et al. | D354,271 S | 1/1995 | Speiser et al. |
| 4,913,511 A | 4/1990 | Tabalba et al. | 5,383,096 A | 1/1995 | Benson et al. |
| 4,926,291 A | 5/1990 | Sarraf | 5,386,346 A | 1/1995 | Gleadall |
| 4,945,229 A | 7/1990 | Daly et al. | 5,398,154 A | 3/1995 | Perkins et al. |
| 4,950,423 A | 8/1990 | Sullivan | 5,402,323 A | 3/1995 | Schwenk et al. |
| 4,952,752 A | 8/1990 | Roun | 5,416,668 A | 5/1995 | Benzoni |
| 4,963,098 A | 10/1990 | Myer et al. | 5,417,590 A | 5/1995 | Dechelette et al. |
| 4,967,311 A | 10/1990 | Ferchau et al. | 5,422,433 A | 6/1995 | Rivera et al. |
| 4,977,329 A | 12/1990 | Eckhardt et al. | 5,434,747 A | 7/1995 | Shibata |
| 4,979,787 A | 12/1990 | Lichtenberger | 5,463,532 A | 10/1995 | Petitpierre et al. |
| 4,990,094 A | 2/1991 | Chandler et al. | 5,470,259 A | 12/1995 | Bethurum |
| 4,991,062 A | 2/1991 | Nguyengoc | 5,477,421 A | 12/1995 | Bethurum |
| 5,001,297 A | 3/1991 | Peregrim et al. | 5,491,613 A | 2/1996 | Petitpierre |
| 4,012,042 A | 4/1991 | Summach | 5,513,996 A | 5/1996 | Annerino et al. |
| 5,005,939 A | 4/1991 | Arvanitakis et al. | 5,527,991 A | 6/1996 | Sadowski et al. |
| 5,006,667 A | 4/1991 | Lonka | 5,528,408 A | 6/1996 | McGinley et al. |
| 5,012,042 A | 4/1991 | Summach | 5,534,662 A | 7/1996 | Peacock et al. |
| 5,015,802 A | 5/1991 | Chi | 5,535,034 A | 7/1996 | Taniguchi |
| 5,029,254 A | 7/1991 | Stickney | 5,545,845 A | 8/1996 | Flores |
| 5,037,331 A | 8/1991 | Goodman et al. | 5,546,281 A | 8/1996 | Poplawski et al. |
| 5,039,194 A | 8/1991 | Block et al. | 5,561,727 A | 10/1996 | Akita et al. |
| 5,043,534 A | 8/1991 | Mahulikar et al. | 5,570,270 A | 10/1996 | Naedel et al. |
| 5,045,635 A | 9/1991 | Kapol et al. | 5,574,814 A | 11/1996 | Noddings et al. |
| 5,047,835 A | 9/1991 | Chang | 5,588,850 A | 12/1996 | Pan et al. |
| 5,069,522 A | 12/1991 | Block et al. | 5,596,663 A | 1/1997 | Ishibashi et al. |
| 5,083,931 A | 1/1992 | Davidge et al. | 5,603,639 A | 2/1997 | Lai et al. |
| 5,094,623 A | 3/1992 | Scharf et al. | 5,613,860 A | 3/1997 | Banakis et al. |
| 5,104,243 A | 4/1992 | Harding | 5,639,262 A | 6/1997 | Lim |
| 5,113,466 A | 5/1992 | Acarlar et al. | 5,639,989 A | 6/1997 | Higgins, III |
| 5,118,904 A | 6/1992 | Nguyengoc | 5,653,596 A | 8/1997 | Banakis et al. |
| 5,120,578 A | 6/1992 | Chen et al. | 5,659,459 A | 8/1997 | Wakabayashi et al. |
| 5,123,066 A | 6/1992 | Acarlar | 5,717,533 A | 2/1998 | Poplawski et al. |
| 5,138,679 A | 8/1992 | Edwards et al. | 5,726,864 A | 3/1998 | Copeland et al. |
| 5,147,220 A | 9/1992 | Lybrand | 5,726,867 A | 3/1998 | Zarreii |
| 5,166,864 A | 11/1992 | Chitwood et al. | 5,734,558 A | 3/1998 | Poplawski et al. |
| 5,175,395 A | 12/1992 | Moore | 5,738,538 A | 4/1998 | Bruch et al. |
| 5,181,863 A | 1/1993 | Welsh | 5,747,735 A | 5/1998 | Chang et al. |
| 5,183,405 A | 2/1993 | Elicker et al. | 5,757,998 A | 5/1998 | Thatcher et al. |
| 5,195,911 A | 3/1993 | Murphy | 5,766,041 A | 6/1998 | Morin et al. |
| 5,202,536 A | 4/1993 | Buonanno | 5,767,999 A | 6/1998 | Kayner |
| 5,204,496 A | 4/1993 | Boulay et al. | 5,864,468 A | 1/1999 | Poplawski et al. |
| 5,207,597 A | 5/1993 | Kline et al. | 5,865,646 A * | 2/1999 | Ortega et al. ............... 439/607 |
| 5,211,566 A | 5/1993 | Bates et al. | 5,879,173 A | 3/1999 | Poplawski et al. |
| 5,212,751 A | 5/1993 | Brownjohn | 5,901,263 A | 5/1999 | Gaio et al. |

| Patent No. | Date | Inventor |
|---|---|---|
| 5,963,693 A | 10/1999 | Mizue et al. |
| 5,966,487 A | 10/1999 | Gilliland et al. |
| 5,980,324 A | 11/1999 | Berg et al. |
| 6,047,172 A | 4/2000 | Babineau et al. |
| 6,062,893 A | 5/2000 | Miskin et al. |
| 6,074,228 A | 6/2000 | Berg et al. |
| 6,078,465 A | 6/2000 | Kodama |
| 6,085,006 A | 7/2000 | Gaio et al. |
| RE36,820 E | 8/2000 | McGinley et al. |
| 6,118,071 A | 9/2000 | Munch et al. |
| 6,142,802 A | 11/2000 | Berg et al. |
| 6,149,465 A | 11/2000 | Berg et al. |
| 6,155,878 A | 12/2000 | Chen |
| 6,178,096 B1 | 1/2001 | Flickinger et al. |
| 6,179,627 B1 | 1/2001 | Daly et al. |
| 6,200,041 B1 | 3/2001 | Gaio et al. |
| 6,201,704 B1 | 3/2001 | Poplawski et al. |
| 6,203,333 B1 | 3/2001 | Medina et al. |
| 6,206,582 B1 | 3/2001 | Gilliland |
| 6,206,730 B1 | 3/2001 | Avery et al. |
| 6,213,651 B1 | 4/2001 | Jiang et al. |
| 6,220,873 B1 | 4/2001 | Samela et al. |
| 6,220,878 B1 | 4/2001 | Poplawski et al. |
| 6,234,686 B1 | 5/2001 | Tonai et al. |
| 6,239,427 B1 | 5/2001 | Mizue |
| 6,241,534 B1 | 6/2001 | Neer et al. |
| 6,267,606 B1 | 7/2001 | Poplawski et al. |
| 6,304,436 B1 | 10/2001 | Branch et al. |
| 6,335,869 B1 | 1/2002 | Branch et al. |
| 6,341,899 B1 | 1/2002 | Shirakawa et al. |
| 6,350,063 B1 | 2/2002 | Gilliland et al. |
| 4,322,572 A1 | 3/2002 | Snyder |
| 6,358,066 B1 | 3/2002 | Gilliland et al. |
| 6,371,787 B1 | 4/2002 | Branch |
| 6,416,361 B1 | 7/2002 | Hwang |
| 6,439,781 B1 * | 8/2002 | Gaio et al. .................... 385/92 |
| 6,459,517 B1 * | 10/2002 | Duncan et al. .............. 398/135 |
| 6,461,058 B1 | 10/2002 | Birch et al. |
| 6,672,901 B2 * | 1/2004 | Schulz et al. ............... 439/607 |
| 6,780,053 B1 * | 8/2004 | Yunker et al. .............. 439/607 |
| 2002/0068481 A1 * | 6/2002 | Flickinger et al. .......... 439/607 |
| 2002/0131122 A1 | 9/2002 | Anderl et al. |

* cited by examiner

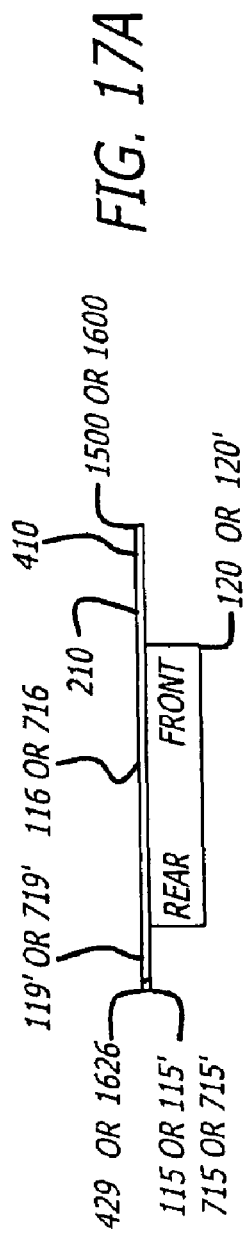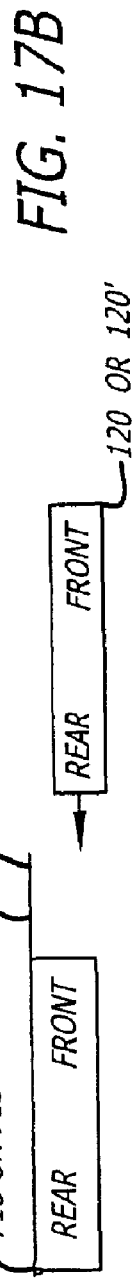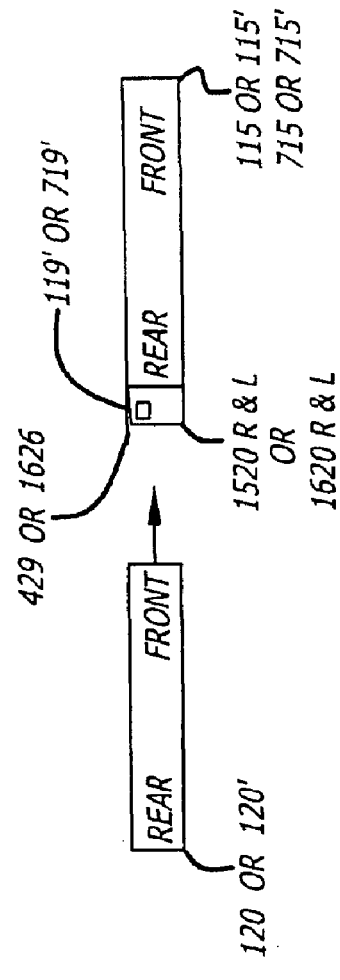

US 6,874,953 B2

METHODS AND APPARATUS FOR FIBER-OPTIC MODULES WITH SHIELDED HOUSINGS/COVERS WITH FINGERS

CROSS REFERENCE TO RELATED APPLICATIONS

This United States non-provisional patent application claims the benefit and is a divisional application of U.S. patent application Ser. No. 09/782,875, filed Feb. 12, 2002 now U.S. Pat. No. 6,659,655 by Dair et al., pending, both of which are to be assigned to E20 Communications, Inc.

FIELD OF THE INVENTION

The invention relates to electromagnetic shielding, and more specifically, to electromagnetic shielding of fiber-optic modules.

BACKGROUND OF THE INVENTION

As the need for greater data bandwidth over networks has exploded over the past few years, there has been a move towards using optical fibers as a transmission medium. Today, optical fiber made of dielectric materials are routinely used in communication channels from large public transmission media to Local Area Networks transmitting information from one node to another. The main difference between a fiber-optic communication system and other types of communication systems is that signals are transmitted as light or photons over optical fibers. Optical fiber or fiber-optic cables enable high speed communication of signals by guiding light or photons therein. At each end of a fiber-optic cable a transducer may be found that converts a light, photon or optical signal into an electrical signal; an electrical signal into a light, photon or optical signal; or a pair of transducers may do both. At a transmission end, an electrical-to-optical converter (EO) converts electrical signals into light or optical signals. At a receiving end, an optical-to-electrical converter (OE) converts a light, photon or optical signal into an electrical signal. In nodes of a communication system, it may be desirable to both transmit and receive light or optical signals at a node. In which case an optical-to-electrical converter (OE, i.e. receiver) and an electrical-to-optical converter (EO, i.e. transmitter) may be included to receive and transmit optical or light signals respectively. Therefore, the optical-to-electrical converter (OE, i.e. receiver) and the electrical-to-optical converter (EO, i.e. transmitter) are oftentimes physically located together as a single module referred to as an electro-optic, opto-electronic or fiber-optic transceiver. Fiber-optic transceivers, including fiber-optic transmitters and fiber-optic receivers, can also be referred to as fiber-optic modules.

Because of the high frequency needed in some of the electronics and the electro-optic components, such as the optical-to-electrical converter (OE, i.e. receiver) and electrical-to-optical converter (EO, i.e. transmitter), electromagnetic radiation can be generated which can interfere with other communication systems. This electromagnetic radiation is oftentimes referred to as electromagnetic interference (EMI). Electromagnetic radiation radiating externally out from a fiber-optic module or a system that incorporates the fiber-optic module is of great concern. To reduce electromagnetic radiation from radiating out of fiber-optic modules and systems with fiber optic modules as EMI, external electromagnetic shielding of internal electronic and opto-electronic components is often utilized. The external electromagnetic shielding can additionally reduce effects of external electromagnetic radiation on the internal components of a fiber-optic module and the system.

An external electromagnetic shield for a fiber-optic module is typically formed out of multiple component parts that are coupled together. Employing separate components increases the costs of manufacturing fiber-optic transmitters, receivers and transceivers.

It is desirable to reduce the number of components so that fiber-optic modules, including fiber-optic transmitters, receivers and transceivers, are less expensive to manufacture.

BRIEF DESCRIPTION OF THE DRAWINGS

FIGS. 17A–17C illustrate alternate methods of assembling a housing/shielding unit with a module chassis frame to form a fiber-optic module.

Like reference numbers and designations in the drawings indicate like elements providing similar functionality.

Figure 1:
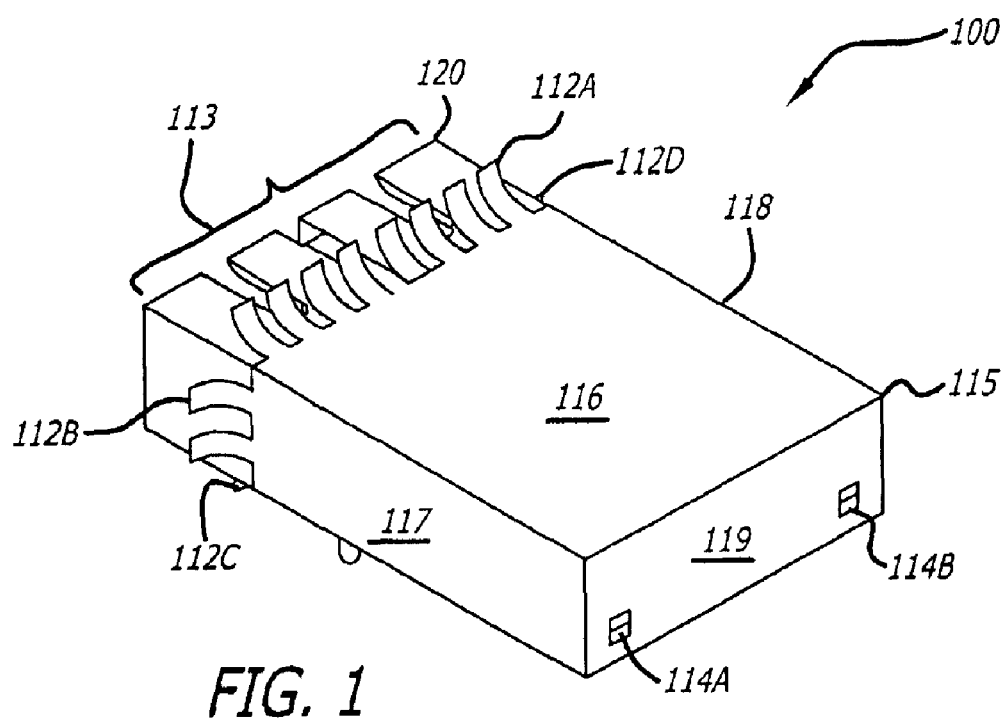
FIG. 1 is a rear isometric view of the fiber-optic module according to a first embodiment of the invention

The one-piece shielded housing provides electromagnetic shielding for a fiber-optic module.

The patterned material layer is a thin and flat sheet used to form a one-piece shielded housing.

DETAILED DESCRIPTION OF THE INVENTION

In the following detailed description of the invention, numerous specific details are set forth in order to provide a thorough understanding of the invention. However, it will be obvious to one skilled in the art that the invention may be practiced without these specific details. In other instances well known methods, procedures, components, and circuits have not been described in detail so as not to unnecessarily obscure aspects of the invention.

The invention includes embodiments of fiber-optic modules and their methods of manufacture and assembly of component parts. Fiber-optic module generally refers to fiber-optic transmitter modules, fiber-optic receiver modules, and fiber-optic transceiver modules. The various fiber-optic modules can also be referred to as opto-electronic transmitter, receiver or transceiver modules; and electro-optic transmitter, receiver or transceiver modules. The fiber-optic module of the invention is capable of reducing electromagnetic interference (EMI) from both the fiber-optic module and from the system that incorporates the fiber-optic module. In accordance with one embodiment of the invention, a fiber-optic module comprises a module chassis frame and a housing/shielding unit. The housing/shielding unit can be formed of one piece in which case it can also be referred to as a one-piece integrated housing/shielding unit, a one piece shielded housing, an EMI box or container, or a single-piece shielded housing integrating a protection function and a shielding function. The module chassis frame can also be referred to as a chassis, a frame, or a support fixture. The housing/shielding unit functions both as a protective outer housing for the fiber-optic module as well as an EMI suppression device and a chassis grounding feature. The housing/shielding unit can protect and shield the optical, electrical, and optical-electrical components within a fiber-optic module. The housing/shielding unit can be formed out of conductive materials such as a metal, a plated plastic, a conductive plastic or other electrically conductive material. The module chassis frame can be formed of a nonconductive material such as a non-conductive plastic. The module chassis frame can also be formed of a conductive material such as sheet metal, a plated plastic, or conductive plastic so as to provide EMI shielding as well. The module chassis frame is the central structural support to which components of the fiber-optic module attach. These components can include an opto-electronic transmitter and/or an opto-electronic receiver. In the case of a fiber-optic transceiver module, the fiber-optic module includes a transmitter optical subassembly, a receiver optical subassembly and an electrical subassembly. Each of the opto-electronic transmitter and the opto-electronic receiver has a header which is shielded by a hollow cylindrical shielding collar. The hollow cylindrical shielding collar provides electromagnetic shielding as well. The opto-electronic transmitter may include a Vertical Cavity Surface Emitting Laser (VCSEL) or a conventional semiconductor laser mounted inside of the header.

The housing/shielding is a multi-sided conductive enclosure than can be formed out of sheet metal, plated plastic, conductive plastic or other electrically conductive material. In one embodiment, sheet metal is etched or stamped to form the housing/shielding unit. The housing/shielding unit also includes a pair of flaps and a septum which allow it to be spot-welded, soldered, glued or otherwise fastened after it is attached to the module chassis frame. The housing/shielding unit forms an enclosure that surrounds the module chassis frame. Fingers or tabs extend from the housing/shielding unit to ground it to a bezel, a faceplate or a wall of a housing of a host system. In one embodiment, the fingers press against the bezel, the faceplate or the wall of the housing of the host system to seal electromagnetic radiation therein. In another embodiment, the fingers press against an opening in the bezel, the faceplate or the wall of the housing of the host system to seal electromagnetic radiation therein.

The grounding scheme for the fiber-optic module includes signal grounding and chassis grounding. Two grounds are utilized for isolation to prevent currents induced in the chassis ground from affecting the integrity of signal ground. Signal ground is provided through one or more ground pins of a transceiver printed circuit board (PCB) next to the signal pins. The one or more ground pins couple to ground traces on a printed circuit board of the host system. Chassis ground is established by coupling to an outer housing of the host system which is electrically isolated from the signal ground.

The invention employs a housing/shielding unit that functions both as protective outer housing as well as an EMI shield or suppression device. The housing/shielding unit is a multi-sided enclosure which can be made from one piece or a single piece of sheet metal, plated plastic or other electrically conductive material having an opening at one end for receiving a fiber-optic connector to couple to one or more fiber-optic cables.

Referring now to FIG. 1, an fiber-optic module 100 of the invention is illustrated. In one embodiment, the fiber-optic module 100 is a 1×9 fiber-optic transceiver module. In which case the fiber-optic module is a duplex-SC transceiver designed for use in Gigabit Ethernet applications and is compliant with specifications for IEEE-802.3z Gigabit Ethernet (1000Base-SX) and Class 1 Laser Safety regulations, operates with 50/125 micrometer and 62.5/125 micrometer multimode optical fibers, has an Industry Standard 1×9 Footprint with integral duplex SC connector and meets a mezzanine height standard of 9.8 mm.

The fiber-optic module 100 includes a one-piece or single-piece integrated housing/shielding unit 115 and a module chassis frame 120. The fiber-optic module 100 with the one-piece or single-piece integrated housing/shielding unit 115 may also be referred to as a forward shield configuration. The housing/shielding unit 115 functions both as a housing and as an EMI shield. The housing/shielding unit 115 minimizes internal electromagnetic radiation from radiating outward and interfering with other electronic circuits and devices. It also minimizes external electromagnetic radiation from radiating inward and interfering with the operation of the fiber-optic module 100. It also minimizes the system electromagnetic radiation from leaking out through an opening in a bezel, a faceplate, of a host panel through which the fiber-optic module is installed. The module chassis frame 120 may be formed of a conductive material, such as a conductive plastic, to provide EMI shielding and to support other components assembled thereto.

The housing/shielding unit 115 has a top side 116, a left side 117, a right side 118, and a back side 119 illustrated in FIG. 1. A pair of tangs 114A and 114B are present in the back side 119 in order to couple the back side 119 together with the left side 117 and the right side 118 respectively. The left side 117 and the right side 118 each have a tang 114A and 114B bent into an opening of a respective flaps (not shown in FIG. 1).

The housing/shielding unit 115 has one or more fingers 112 located near a nose 113 of the fiber-optic module 100 at the edges of a frontal opening 313. The one or more fingers can also be referred to as tabs. The one or more fingers are similarly shaped having a body and a tip which is round in one embodiment. The body of the fingers 112 are bent outward from the main surface in one embodiment. In an alternate embodiment the tips may be slightly bent from the body of the fingers. The fingers can be equally sized and equally spaced or have different sizing and difference spacing between each. Fingers 112A are located along an edge of top side 116 of the housing/shielding unit 115. Fingers 112B are located along an edge of side 117 of the housing/shielding unit 115. Fingers 112C are located along an edge of side 118 (not shown in FIG. 1) of the housing/shielding unit 115. Fingers 112D are located along an edge of side 119 (not shown in FIG. 1) of the housing/shielding unit 115. Fingers 112A, 112B, 112C and 112D are generally referred to as fingers 112. The fingers 112 have a forward curvature and are bent outwardly and slightly backwards from a frontal opening in the housing/shielding unit 115 as illustrated. The fingers 112 can be used to ground the housing/shielding unit 115 by coupling to a bezel or face-plate which is grounded. The fingers 112 are illustrated as being a plurality of fingers but can be one or more fingers on any one or all sides.

Figure 2:
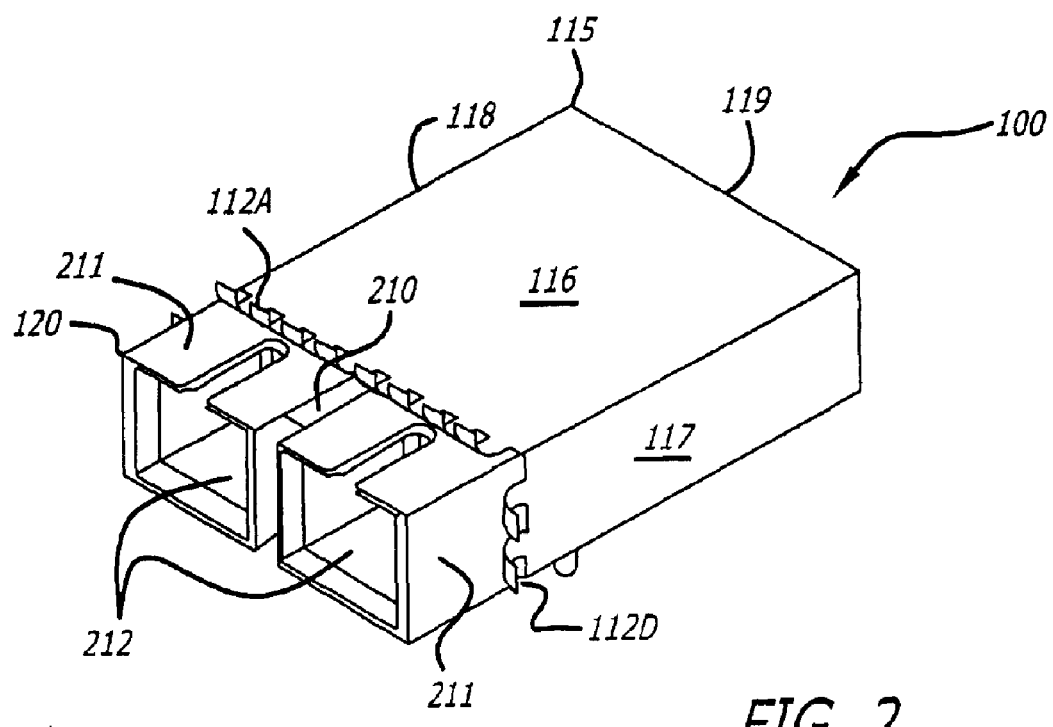
FIG. 2 is a front isometric view of the fiber-optic module according to the first embodiment of the invention

Referring now to FIG. 2, the fiber-optic module 100 includes the housing/shielding unit 115 and the module chassis frame 120. The housing/shielding unit further includes a septum (not shown in FIG. 2) and a nose strap 210. The septum and nose strap are folded back into the frontal opening of the housing/shielding unit around the module chassis frame 120. Prior to folding the septum and nose strap back into the frontal opening, the electrical, optical and electro-optical components are installed on the module chassis frame 120 which is then inserted into the housing 115 in one embodiment, or in another embodiment, the housing is folded around the module chassis frame 120. The nose strap 210 and the septum hold the module chassis frame 120 in place within the housing 115. The module chassis frame 120 includes one or more optical connector receptacles 211 with optical connector openings 212. In one embodiment, the one or more optical connector receptacles 211 are SC optical connector receptacles with the optical connector openings 212 being SC optical connector openings.

Figure 3:
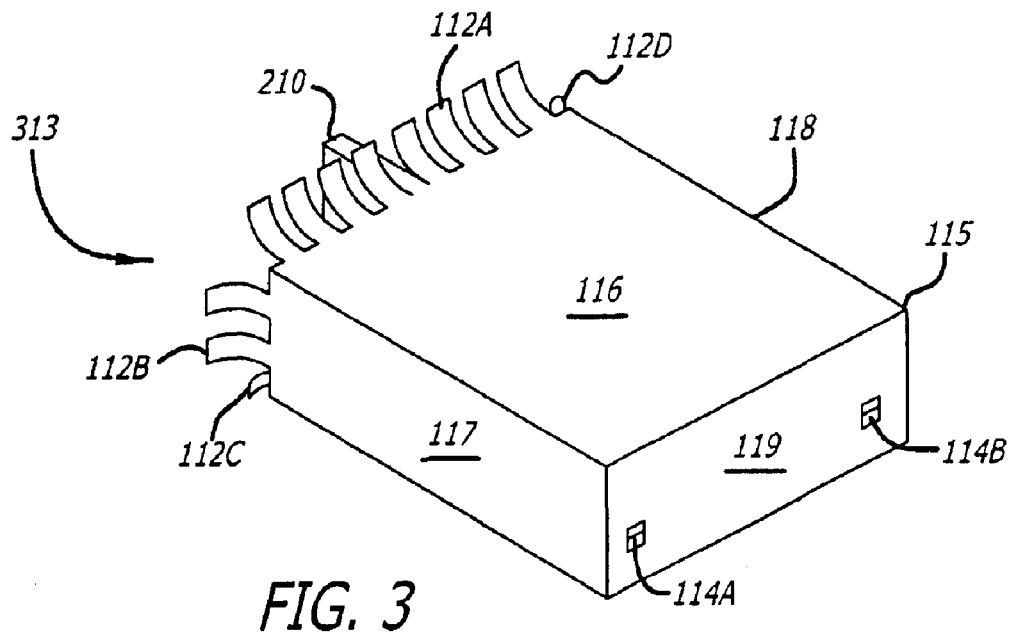
FIG. 3 is a rear isometric view of a housing/shielding unit according to the first embodiment of the invention.

Referring now to FIG. 3, a rear view of the housing/shielding unit 115 is shown. The FIGS. 112A, 112B, 112C, and 112D are located along the edge of the frontal opening 313 of the housing/shielding unit 115 as shown. The housing/shielding unit 115 is a rectangular box made of sheet metal, plated plastic or any other electrically conductive material. Except for a single side of the housing/shielding unit 115 that is open so that the module chassis frame can be inserted into it, all other sides of the housing/ shielding unit can be closed. Once the module chassis frame 120 is inserted into the housing/shielding unit 115 through the open side, it is closed to minimize electromagnetic radiation from the fiber optic module.

Figure 4A:
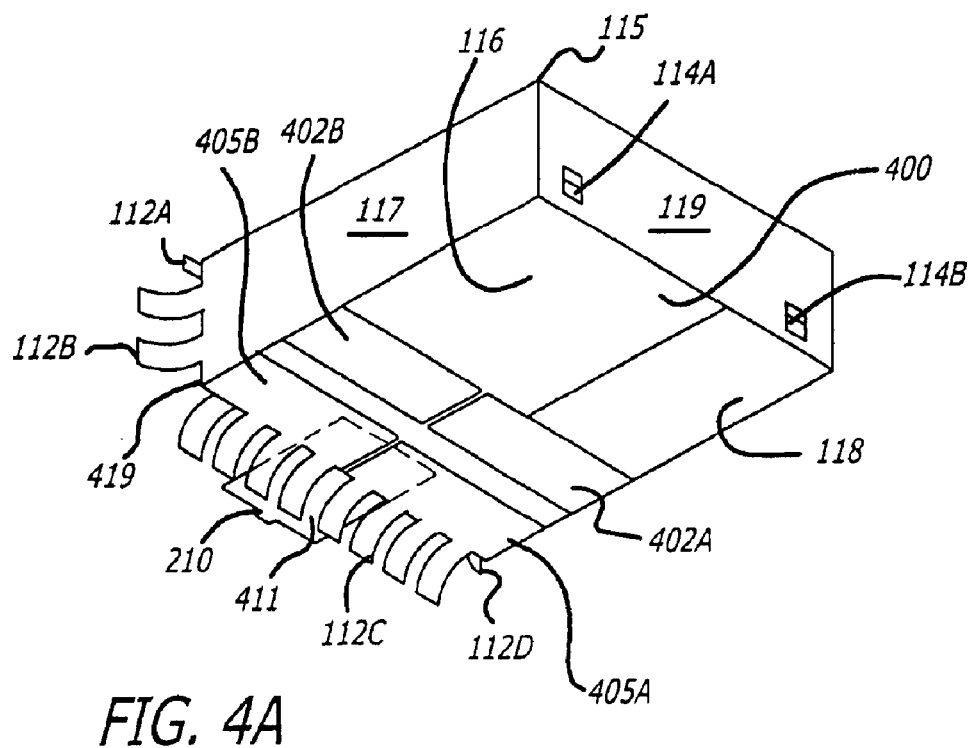
FIG. 4A is a bottom rear isometric view of the housing/shielding unit according to the first embodiment of the invention.

Referring now to FIG. 4A, a bottom view of the housing/shielding unit 115 is shown. The housing/shielding unit 115 has an open region 400 in its bottom side. One or more fingers 112C are located along the edge 419 of the housing/shielding unit 115. The fingers 112 curve outward and point more forward from surfaces of the housing/shielding unit. The fingers 112 have spring-like resilience (i.e. spring loaded or flexible) and provide a mechanical and electrical contact between the fiber-optic module and a bezel, a face-plate or a wall (not shown in FIG. 4). Thus, the fingers 112 can also be referred to as spring fingers or forward fingers. There are also a pair of flaps 402A and 402B and a septum 411 on the bottom side of the housing/shielding unit 115. The septum 411 the flaps 402A–402B and 405A–405B of the housing/shielding unit can be spot welded, soldered, glued, or otherwise fastened together. The housing/shielding unit 115 forms an enclosure that surrounds the module chassis frame 120. Fingers 112A, 112B, 112C, and 112D can ground the housing/shielding unit 115 to seal in electromagnetic radiation to avoid it affecting a host system, and to avoid the electromagnetic radiation of host system from leaking out through the bezel or faceplate openings.

Figure 4B:
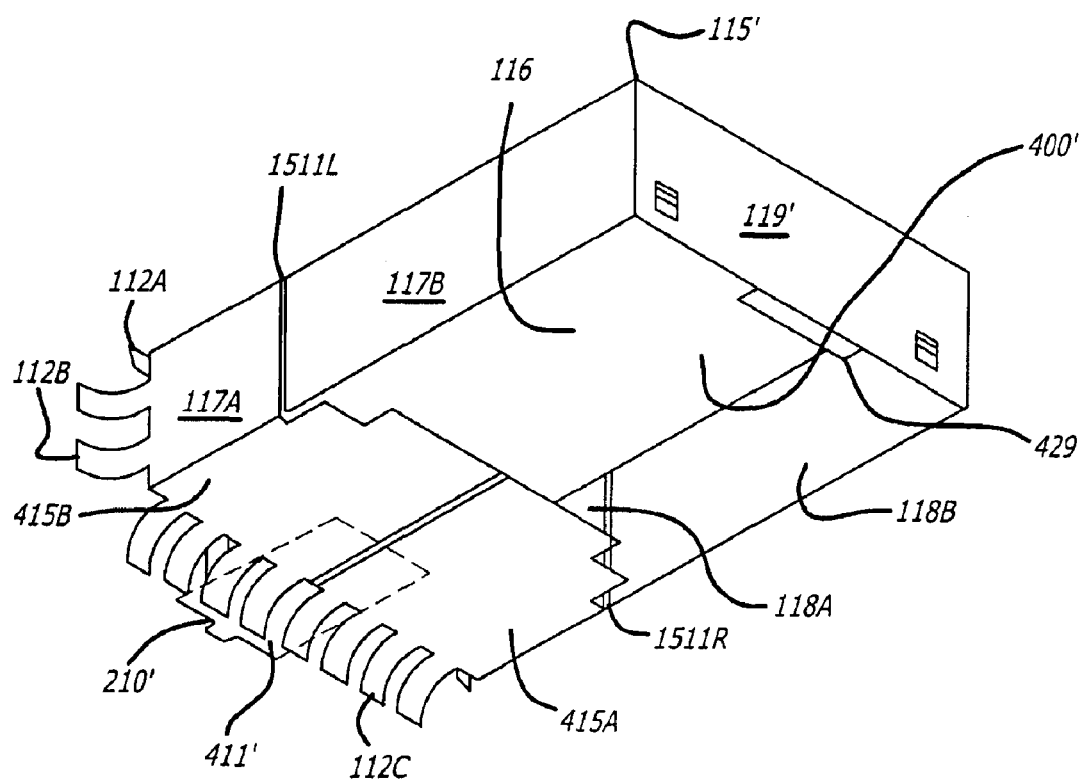
FIG. 4B is a bottom rear isometric view of an alternate housing/shielding unit according to an alternate embodiment of the invention.

Referring now to FIG. 4B, a bottom left side isometric view of an alternate housing/shielding unit 115' is shown. The housing/shielding unit 115' differs from housing/shielding unit 115 in the strap, left side, right side, bottom side and the back side. The housing/shielding unit 115' is additionally longer so that the fingers 112 are nearer the front of the optical connector openings 212. That is back side 119 is replaced by back side 119' with a retaining flap 429; left side flap 117 is replaced by left side flaps 117A and 117B separated by a left side slit 1511L; right side flap 118 is replaced by right side flaps 118A and 118B separated by a right side slit 1511R; bottom side flaps 402A, 402B, 405A and 405B are replaced by bottom side flaps 415A and 415B; strap 210 is replaced by strap 210', septum 411 is replaced by septum 411', and open region 400 is replaced by open region 400'. Otherwise, the housing/shielding unit 115' and the housing/shielding unit 115 have similar elements and features including the one or more fingers 112A, 112B, 112C, and 112D.

The housing/shielding unit 115' forms an enclosure that surrounds the module chassis frame 120 or 120'. Fingers 112A, 112B, 112C, and 112D can ground the housing/shielding unit 115' to seal internal electromagnetic radiation therein to avoid it affecting a host system and keep out external electromagnetic radiation to increase noise immunity of the electronic and opto-electronic components inside. It also minimizes the electromagnetic radiation of the host system from leaking out of the bezel or faceplate openings.

Figure 5A:
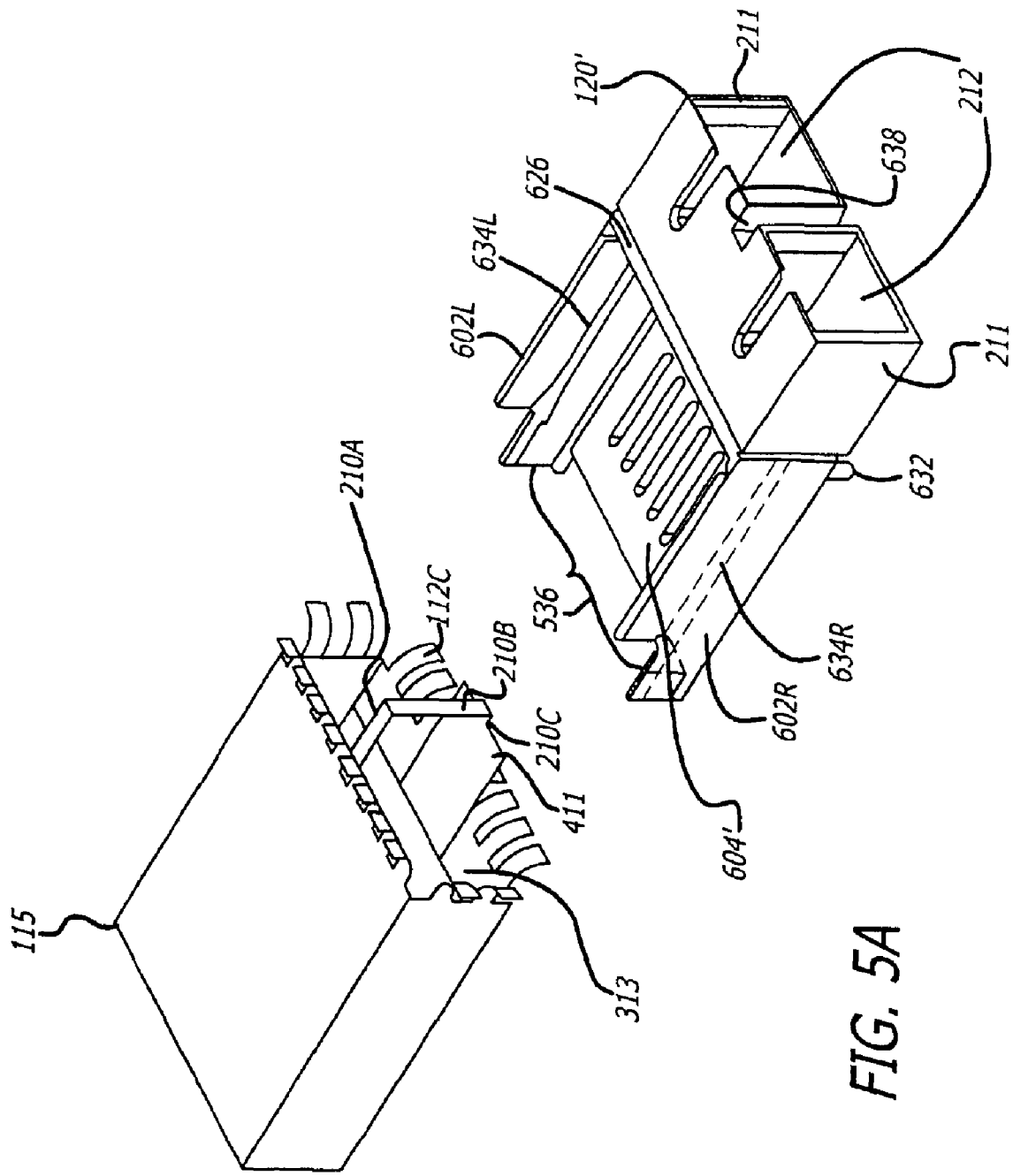
FIG. 5A is an isometric view of a module chassis frame and a housing/shielding unit according to the first embodiment of the invention.

Referring now to FIG. 5A, the housing/shielding unit 115 and an alternate module chassis frame 120' are illustrated. The module chassis frame 120' has a single pin opening 536 in its base 604' through which all pins 612 may extend but otherwise is similar to the module chassis frame 120. The module chassis frame 120' includes the optical connector receptacles 211 at one end and a left wall 602L and a right wall 602R coupled to the base 604' at an opposite end. The walls 602l and 602R each have a slot 634L and 634R respectively on their inside surfaces. The optical connector receptacles 211 have a rectangular opening or slot 626 along the width of the module chassis frame 120'.

The housing/shielding unit 115 includes the front nose strap 210 and the septum 411. The front nose strap 210 may be a metal or a plastic band used for fastening or clamping the module chassis frame 120 to the housing/shielding unit 115. The front nose strap 210 can consists of three portions, a first extension portion 210A, a wrap portion 210B and a second extension portion 210C. The wrap portion 210B engages with the slot 638 of the module chassis frame 120 or 120'. The septum 411 can also be welded or bonded to bottom flaps of the housing/shielding unit 115 to hold the module chassis frame therein.

Figure 5B:
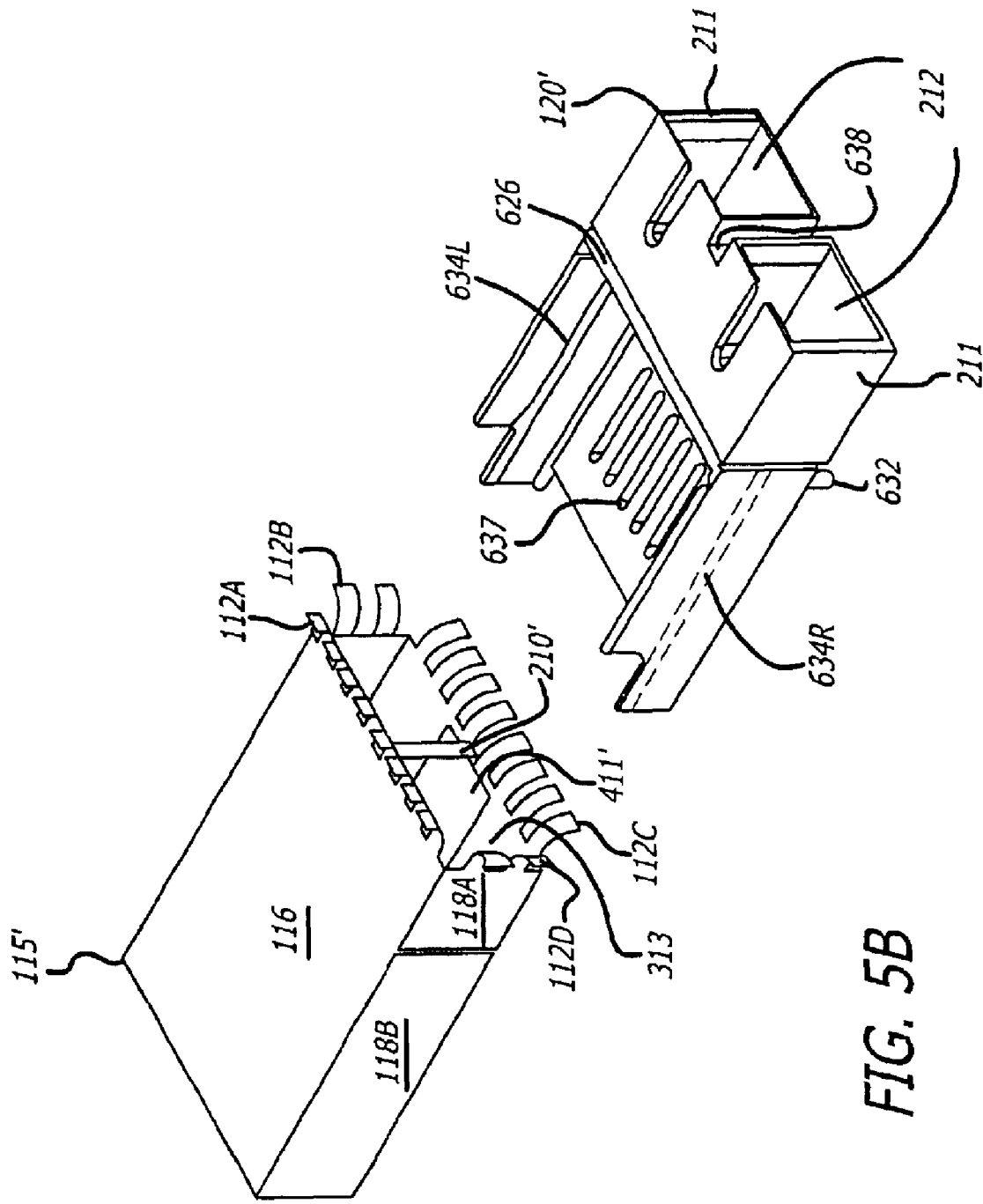
FIG. 5B is an isometric view of a module chassis frame and a housing/shielding unit according to an alternate embodiment of the invention.

Referring now to FIG. 5B, the alternate housing/shielding unit 115' and the alternate module chassis frame 120' are illustrated. The housing/shielding unit 115' includes the front nose strap 210' and the septum 411'. The front nose strap 210' may be a metal or a plastic strap used to fasten or clamp the module chassis frame 120 or 120' to the housing/shielding unit 115'. The front nose strap 210' is a single portion compared to the first extension portion 210A, wrap portion 210B and second extension portion 210C of the front nose strap 210. The nose strap 210' engages with the slot 638 of the module chassis frame 120 or 120'. The septum 411' can be welded or bonded to bottom flaps of the housing/shielding unit 115' to hold the module chassis frame therein.

Figure 6:
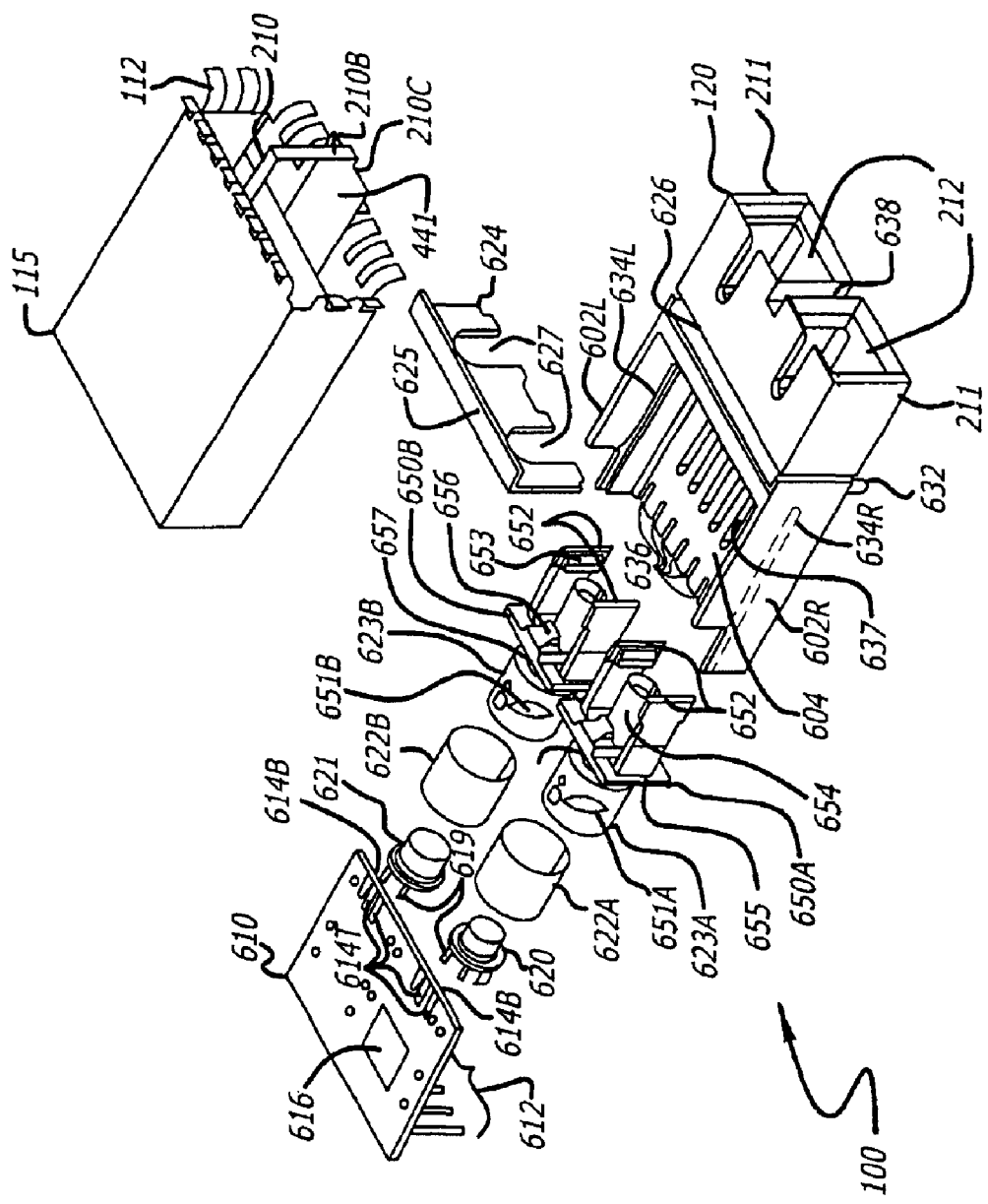
FIG. 6 is an exploded view of the fiber-optic module with the housing/shielding unit and the module chassis frame according to the first embodiment of the invention.

Referring now to FIG. 6, an exploded view of the fiber-optic module 100 of the invention is illustrated. The fiber-optic module 100 includes the integrated one-piece housing/shielding unit 115, the module chassis frame 120, and other optical, electrical and opto-electronic components. The module chassis frame 120 includes the optical connector receptacles 211 at one end and a left wall 602L and a right wall 602R coupled to a base 604 at an opposite end. The walls 602l and 602R each have a slot 634L and 634R respectively on their inside surfaces. The optical connector receptacles 211 have a rectangular opening or slot 626 along the width of the module chassis frame 120. The base 604 has one or more pin openings 636.

The optical, electrical and opto-electronic components of the fiber-optic module 100 are assembled into the module chassis frame 120. The components include a printed circuit board (PCB) 610, a packaged transmitter 620 for transmitting optical signals, a packaged receiver 621 for receiving optical signals, a pair of shielding collars 622A and 622B, a pair of SC connectors 650A and 650B, and a U-Plate 624. The shielding collars 622A and 622B can be formed from rolled sheet metal, a plated plastic, a conductive plastic, or other conductive material formed into a hollow cylinder.

In one embodiment, the transmitter 620 is an 850-nm VCSEL and the receiver 621 an integrated GaAs PIN-preamplifier or PIN-diode.

The printed circuit board 610 includes one or more PCB signal pins 612, edge traces 614 on each side for straddle mounting the transmitter 620 and the receiver 621, and integrated circuits 616 for processing signals between the signal pins 612 and the transmitter 620 and the receiver 621. The integrated circuits 616 may use a five volt (5 v), a three volt (3 v) or other common power supply voltage used in integrated circuits and host systems. The PCB signal pins 612 can include a transmit ground pin for transmitter components and a receive ground pin for receiver components. In an alternate embodiment, a single ground pin for electronic components may be provided, isolated from any shielding ground features for the fiber-optic module. The printed circuit board (PCB) 610 may have a ground plane on its top or bottom surfaces to couple to ground and further provide electromagnetic shielding.

The module chassis frame 120 includes a rectangular opening or slot 626, a pair of mounting posts 632 extending from its base 604 near left and right sides, slots 634L and 634R on inner sides of the walls 602L and 602R, one or more pin openings 636, and one or more optical connector receptacles 211 with one or more optical connector openings 212. In one embodiment, the one or more optical connector openings 212 is two and the optical connector openings are SC optical connector openings for a duplex SC optical connection. The one or more optical connector openings 212 is separated by a slot 638. The rectangular opening 626 receives the U-plate 624. The one or more pin openings 636 receives the one or more PCB signal pins 612. The slots 634L and 634R are press-fit slots and receive the sides of the printed circuit board 610. The pair of mounting posts 632 allow the transceiver to be mechanically coupled to a printed circuit board or the like. The mounting posts 632 can also be connected to chassis ground but should not be connected to signal ground.

The grounding scheme of the fiber-optic module can be divided into categories of signal grounding and chassis grounding. The separation of signal grounding from chassis grounding can keep currents induced in a chassis ground from affecting signal integrity. Signal ground is through one or more ground pins of the PCB pins 612 coupled from the PCB 610 to a ground trace in a host printed circuit board. The housing/shielding unit 115 or 115' is part of the chassis ground and electrically isolated from the signal ground. The housing/shielding unit 115 or 115' couples to chassis ground of a host system through one or more of the fingers. The one or more fingers couple to a host panel near a host panel opening through which the fiber-optic module may extend. The fingers surround the host panel opening and effectively reduce the size of the opening through which radiated electromagnetic energy may escape to seal the host panel opening through which the fiber-optic module may protrude. With the housing/shielding unit 115 or 115' coupled to chassis ground, it acts as a plug to block EMI radiated emissions from escaping. Additionally, the smaller the host panel opening, the greater the shielding effectiveness as the host system begins to resemble a Faraday cage.

The packaged transmitter 620 may contain a VCSEL or a conventional semiconductor laser and is mounted inside the transmitter port 623A. The packaged receiver 621 may include a PIN diode that is mounted inside the receiver port 623B. In one embodiment, the transmitter and receiver are each packaged into a TO package and may be referred to as the Tx Header and Rx Header respectively. Each of the packaged transmitter 620 and receiver 621 have one or more pins or terminals 619 which couple to the edge traces 614 on each side of the printed circuit board 610 to straddle mount them.

The SC connectors 650A and 650B include a lens 651A and 651B mounted inside ports 623A and 623B respectively. The ports can also be referred to as TO-can receptacles, TO-can holders, lens holders, etc. Semiconductor lasers and/or PINs can be mounted into metal TO-cans, which are then aligned into the ports or receptacles. The ports or receptacles have lenses between the fiber ferrules and the TO-cans. Note that lasers and photodiodes are not required to be packaged in TO-cans and can be packaged in other ways to mate with various shaped ports or receptacles. The ports and the packaging of the semiconductor lasers and/or PINs need only facilitate that light can be transmitted or received as the case may be. Each of the SC connectors 650A and 650B further includes a pair of snap lock clips 652 each having a retaining protrusion 653, ferrule barrels 654, support struts 656 in a front portion. Each of the SC connectors 650A and 650B further includes circular recesses 657 between each of the headers 623A and 623B and their respective flanges 655 in a rear portion. Each of the circular recesses 657 mates with the U-shaped openings 627 of the U-plate 624.

The transmitter package is assembled to the SC connector to form the Transmitter Optical Subassembly (Tx OSA). This Transmitter Optical Subassembly is then soldered onto the PCB 610. Prior to soldering the header assemblies 623A and 623B, the pair of shielding collars 622A and 622B are attached with solder to the rear of the ports 623A and 623B. The PCB 610 may be secured by two press-fit slots, one in each inner side of the module chassis frame 120. The U-plate 624 provides additional EMI sealing by minimizing leakage through the front of the module. The U-plate 624 also includes a flap 625 located at its top side. The U-plate 624 is electrically grounded to the housing/shielding unit 115 by the flap 625 making physical contact with the housing/shielding unit 115.

The optical, electro-optical, and the electronic components are assembled into the module chassis frame 120 or 120' before the housing/shielding unit 115 encloses it. The transmitter 620 and the receiver 621 have their pins 619 coupled to the traces 614T and 614B of the printed circuit board 610. In one embodiment the pins 619 are straddle mounted to the printed circuit board 610 with some pins 619 coupled to the traces 614T on a top side of the PCB 610 and other pins 619 coupled to the traces 614B on a bottom side of the PCB 610. That is, one or more pins mount to one or more traces on one side of the printed circuit board and another one or more pins mount to one or more traces on an opposite side of the printed circuit board.

The shielding collars 622A and 622B are inserted over the ports 623A and 623B of the connectors 650A and 650B respectively to provide EMI shielding. The TO packaged transmitter 620 and receiver 621 are coupled into the ports 623B and 623A respectively. This forms the optical subassembly which is then attached to the electrical components that is in turn coupled into the module chassis frame 120. The front portion of the connectors 650A and 650B are inserted into openings 212 in the nose of the module chassis frame 120 so that the pairs of snap lock clips 652 of each are nearly flush. Next the U-plate 624 is inserted into opening 626 so that its U-openings 627 fit into the circular recesses 657 of each respective connector 650A and 650B. The U-plate 624 holds the subassembly of the optical and electrical components coupled into the module chassis frame 120. Additionally, the U-plate 624 can couple to the shielding collars 622A and 622B and the housing/shielding unit 115 or 115'. The flap 625 of the U-plate 624 couples to the housing/shielding unit 115 or 115' when the fiber-optic module is fully assembled. This can electrically connect the collars 622A and 622B, the U-plate 624 and the housing/shielding unit 115 or 115' together if all are formed of conductive materials. Assuming they are electrically connected, grounding the housing/shielding unit 115 or 115' to chassis ground of a host system can also couple chassis ground into the U-plate 624 and the shielding collars 622A and 622B for electromagnetic shielding externally as well as internally. The TO-can headers of the receiver and transmitter are coupled to signal ground or the respective receiver ground and transmitter ground.

After the subassembly of optical and electrical components are coupled into the module chassis frame 120 or 120', the housing/shielding unit 115 or 115' can then be assembled around it. Assembly of the housing/shielding unit 115 or 115' with the module chassis frame 120 or 120' can be performed in different ways.

The housing/shielding unit 115 or 115' can be formed out of a single sheet of material. It can then be folded around the module chassis frame 120 or 120' with the affixed subassembly of optical and electrical components. Alternatively, the housing/shielding unit 115 or 115' can be pre-folded out of the single sheet of material but for one opening at a front or rear end. The module chassis frame 120 or 120' with an affixed subassembly of optical and electrical components can then be inserted into the opening at the front or rear end of the housing/shielding unit 115 or 115'.

In one embodiment, the housing/shielding unit 115 has all sides pre-folded but for the back side 119. The back side 119 is left unfolded so that the module chassis frame 120 can be inserted through a rear opening of the housing/shielding unit 115. In this case, a nose end of the module chassis frame 120 and the subassembly of optical and electrical components affixed thereto is inserted through the rear opening in the back of the housing/shielding unit 115 with its nose facing forward. After being completely inserted, the back side 119 is then folded down to have the tangs 114A and 114B bent inward to mate with window openings of flaps coupled to each side 117 and 118 to finish assembly of the housing/shielding unit 115 around the module chassis frame 120.

In another embodiment, the housing/shielding unit 115 has all sides pre-folded but for the septum 411 and strap 210. The septum 411 and strap 210 are left unfolded so that the module chassis frame 120 can be inserted through a frontal opening of the housing/shielding unit 115. The septum 411 and strap 210 are then folded around the module chassis frame 120 to form the housing/shielding unit 115. In this case, a rear end of the module chassis frame 120 and the affixed subassembly of optical and electrical components is inserted through the frontal opening of the housing/shielding unit 115 so that the rear faces rearward. After being completely inserted, the septum 411 and strap 210 are then folded down and around as illustrated in FIG. 5 to finish assembly of the housing/shielding unit 115 around the module chassis frame 120.

In yet another embodiment, all sides of the housing/shielding unit 115 are folded around the module chassis frame 120 and its affixed components. These methods of assembly are further described below with reference to FIGS. 14–17C.

After assembling the housing/shielding unit 115 around the module chassis frame 120 and its affixed components, then the septum 411 is welded, soldered, glued, or otherwise fastened to the pair of flaps 402A and 402B as shown in FIG. 4.

Figure 7:
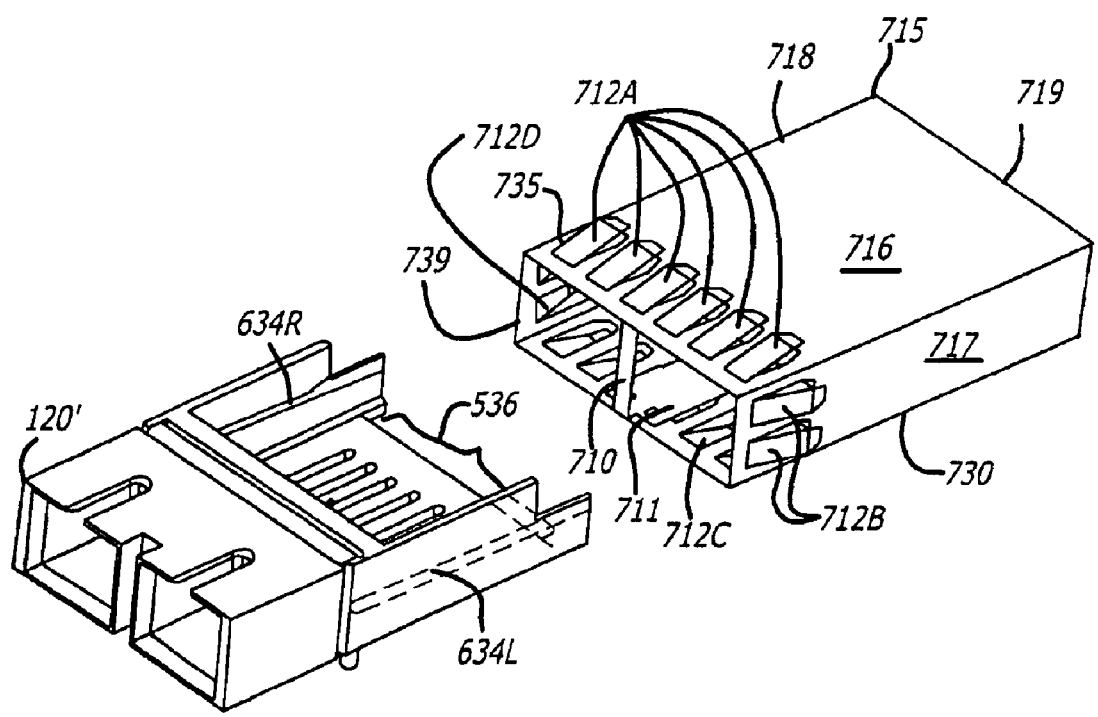
FIG. 7 is an isometric view of a module chassis frame and a housing/shielding unit for an fiber-optic module according to a second embodiment of the invention.

Referring now to FIG. 7, an perspective view of a housing/shielding unit 715 and the module chassis frame 120 for a fiber-optic module 700 are illustrated. The housing/shielding unit 715 is somewhat similar to the housing/shielding unit 115 but has slightly different dimensions, a few different features and employed in different mounting configurations. The housing/shielding unit 715 has one or more fingers 712 which are carved out of the surfaces near the perimeter 735 of an open end 739. The one or more fingers can also be referred to as tabs. The one or more fingers are similarly shaped having a body and a tip which is round in one embodiment. The body of the fingers 712 is bent from the main surface while the tips may be slightly bent from the body to horizontal with the surface. The fingers 712 have a backwards orientation, originating at the front or nose of the fiber-optic module 700. Thus, the one or more fingers 712 may also be referred to as backward fingers and the fiber-optic module 700 with the housing/shielding unit 715 may also be referred to as a fiber-optic module with a backward shield configuration.

The fingers 712 can be grouped into fingers 712A and fingers 712C located on a top 716 and a bottom 730 respectively of the housing/shielding unit 715. Fingers 712B and 712D are located along the edges of the opening of the housing/shielding unit 715. Although FIG. 7 illustrates six fingers 712A on a top side 716 and six fingers 712C on a bottom side 730, two fingers 712B on a left side 717, and two fingers 712D on a right side 718, one or more fingers 727 can provide a means of grounding the housing/shielding unit 715.

The housing/shielding unit 715 differs further from the housing/shielding unit 115 in that it has a different nose strap 710. The strap 710 and the septum 711 function similarly to the strap 210' and the septum 411 of the housing/shielding unit 115'. Because the dimensions of the housing/shielding unit 715 are larger so that it can extend further forward through an opening, the strap 710 differs significantly from the strap 210 of the housing/shielding unit 115.

Figure 8A:
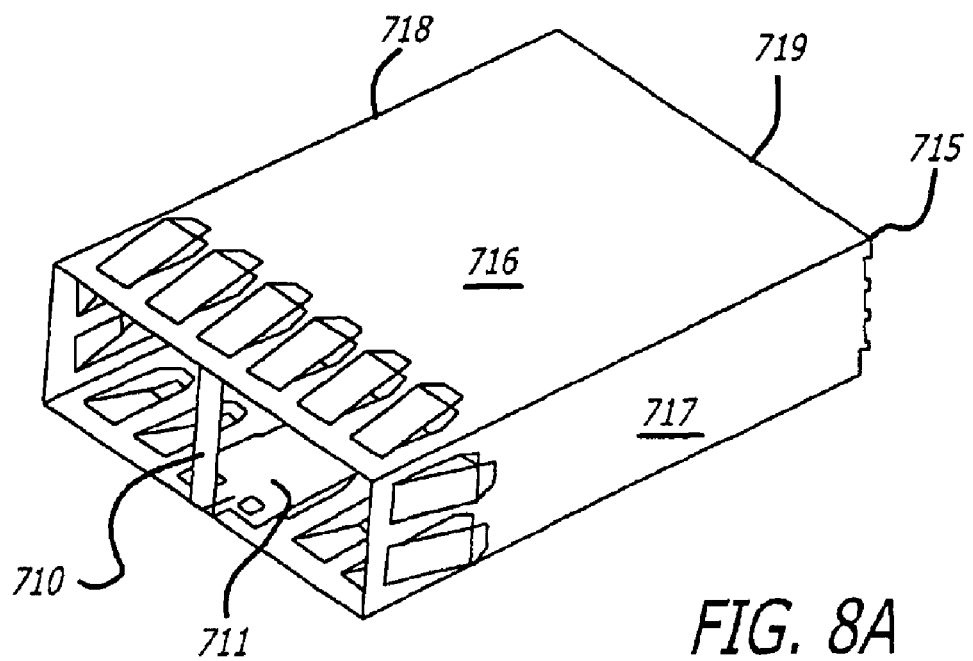
FIG. 8A is a front isometric view of a housing/shielding unit according to the second embodiment of the invention.

Referring now to FIG. 8A, a front view of the housing/shielding unit 715 is shown. In this embodiment, the housing/shielding unit 715 generally has the shape of an oblong box having six sides. Front side 738 has a frontal opening 739 where the module chassis frame 120 can be inserted. The front side 738 of the housing/shielding unit 715 includes the septum 710 that is welded or bonded to the flaps 910A and 910B. The nose strap 711 also located at the opening 739 is used for strapping the housing/shielding unit to the module chassis frame 120.

Figure 9A:
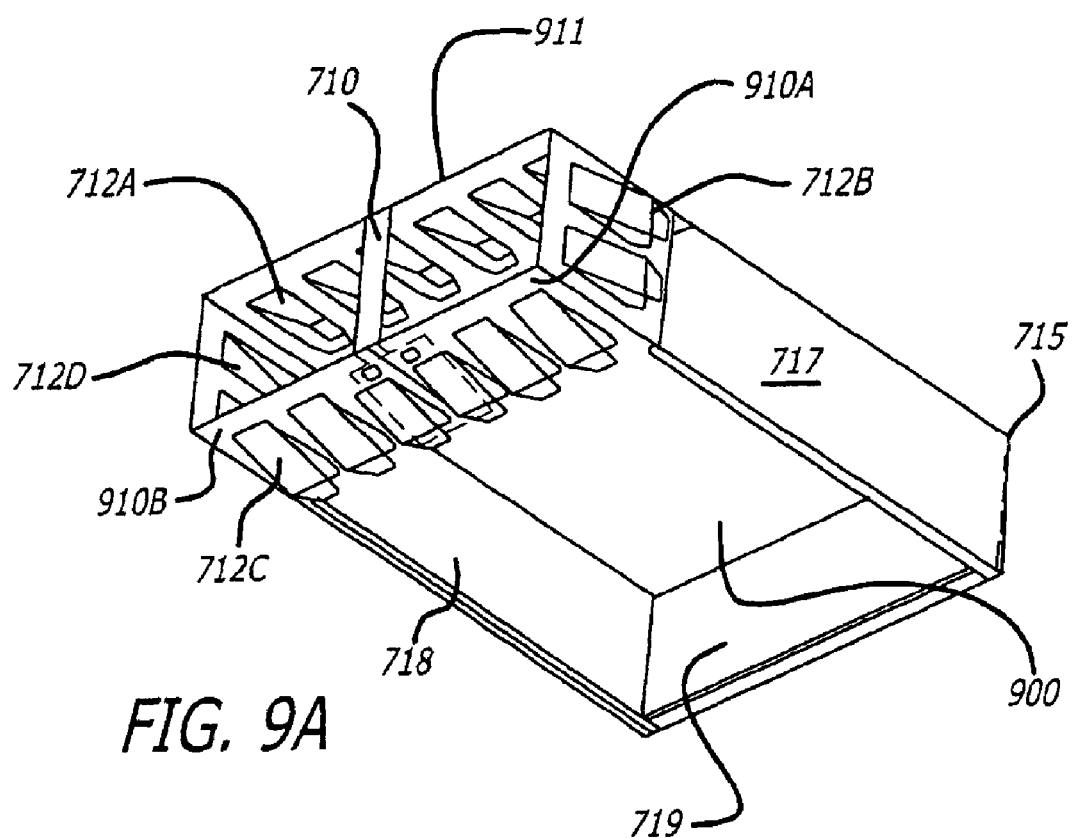
FIG. 9A is a bottom isometric view of the housing/shielding unit according to the second embodiment of the invention.

Referring now to FIG. 9A, a bottom isometric view of the housing/shielding unit is shown. Attached to the open end 911 is a front strap 710 shown in the folded down position. Also shown, are two bottom flaps 910A and 910B for welding or bonding to septum 711.

Figure 8B:
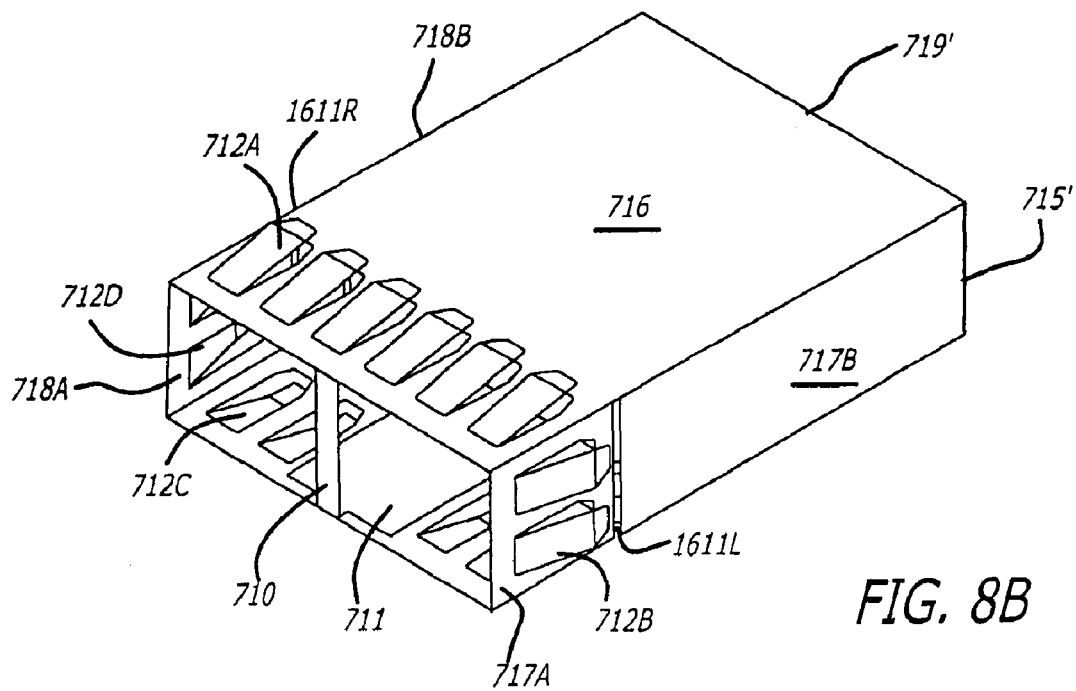
FIG. 8B is a front isometric view of an alternate housing/shielding unit according to an alternate embodiment of the invention.

Referring now to FIG. 8B, a front view an alternate embodiment of the housing/shielding unit 715' is shown. In this alternate embodiment, the housing/shielding unit 715' generally has a similar shape to the housing/shielding unit 715. The housing/shielding unit 715' differs from housing/shielding unit 715 in the left side, right side, bottom side and the back side. That is back side 719 is replaced by back side 719' with a retaining flap 429; left side flap 717 is replaced by left side flaps 717A and 717B separated by a left side slit 1611L; right side flap 718 is replaced by right side flaps 718A and 718B separated by a right side slit 1611R; and bottom side flaps 910A and 910B are replaced by bottom side flaps 910A' and 910B'. Otherwise the housing/shielding unit 715' and the housing/shielding unit 715 have similar elements and features including the one or more fingers 712A, 7123, 712C, and 712D.

The housing/shielding unit 715' forms an enclosure that surrounds a module chassis frame 120 or 120'. Fingers 712A, 712B, 712C, and 712D can ground the housing/shielding unit 715' to seal in electromagnetic radiation (EMI) to minimize affecting a host system.

Figure 9B:
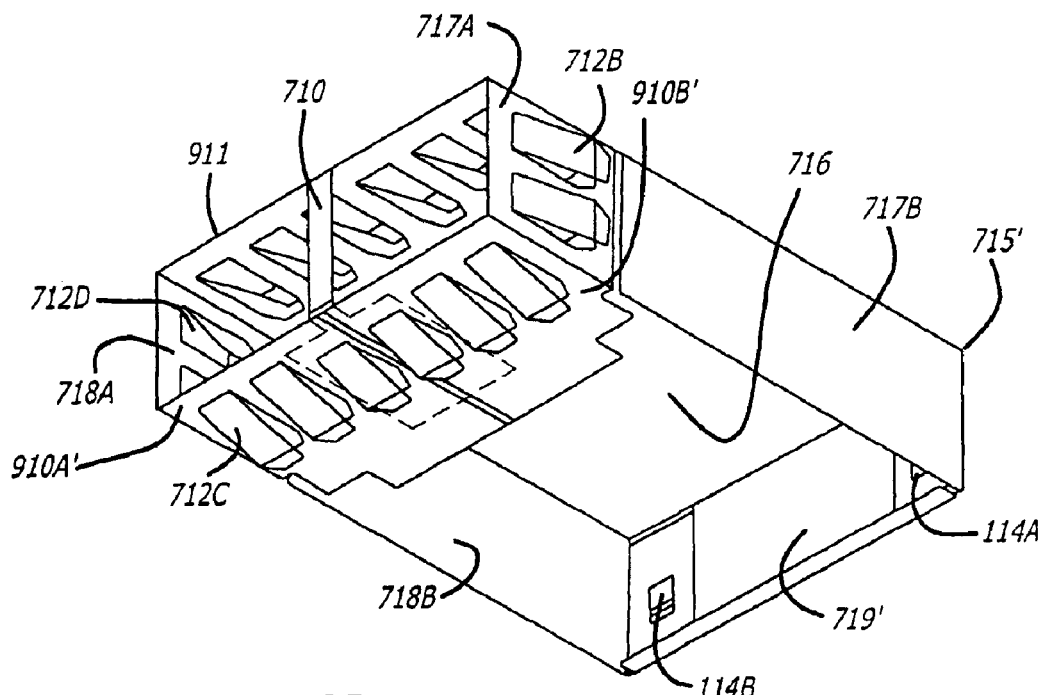
FIG. 9B is a bottom rear isometric view of an alternate housing/shielding unit according to an alternate embodiment of the invention.

Referring now to FIG. 9B, a bottom isometric view of the alternate housing/shielding unit 715' is shown. Attached to the open end 911 is a front strap 711 shown in the folded down position. Also shown, are two bottom flaps 910A' and 910B' for welding or bonding to septum 710.

Figure 10A:
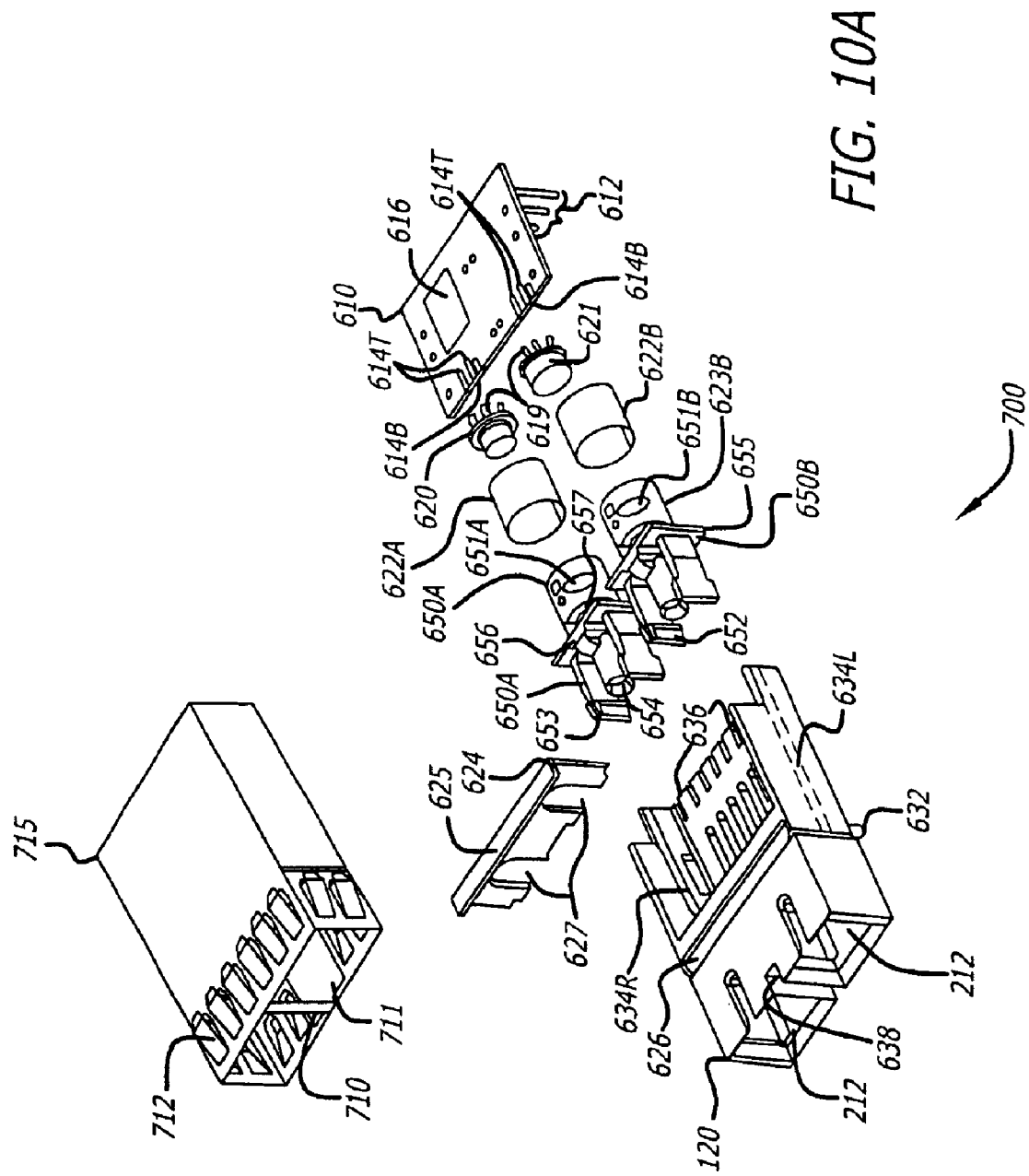
FIG. 10A is a top exploded view of the second embodiment of the fiber-optic module according to the invention.
Figure 10B:
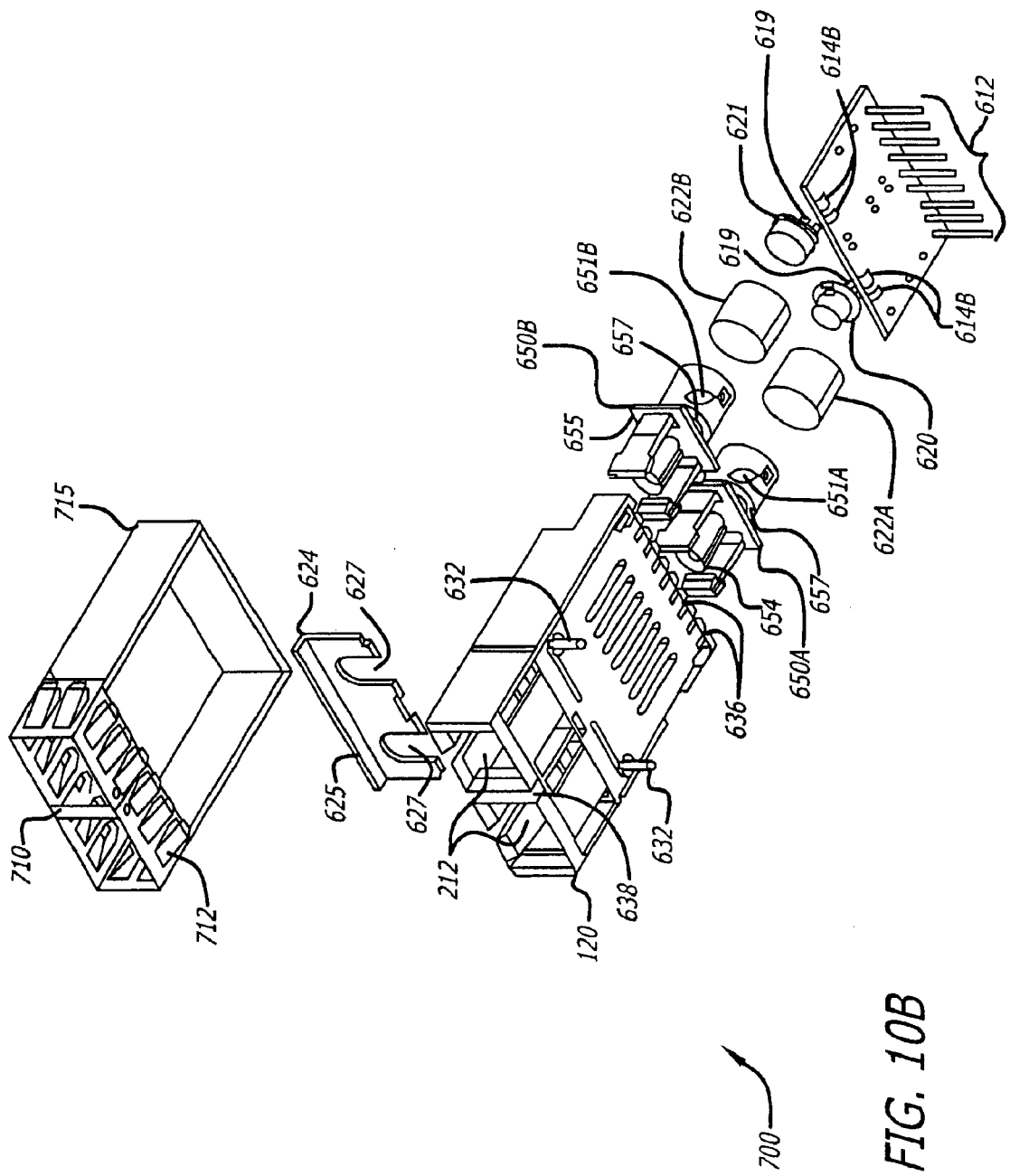
FIG. 10B is a bottom exploded view of the second embodiment of the fiber-optic module according to the invention.

Referring now to FIGS. 10A and 10B, a top and bottom exploded view of the fiber-optic module 700 of the invention is shown. In one embodiment, the fiber-optic module 700 is a 1×9 fiber-optic transceiver module. In which case, the fiber-optic module transceiver complies with the industry standard 1×9 footprint and meets the mezzanine height requirement of 9.8 mm.

The grounding scheme of the fiber-optic module can be divided into categories of signal grounding and chassis grounding. The separation of signal ground from chassis ground can keep currents induced in a chassis ground from affecting signal integrity. Signal ground is through one or more ground pins of the PCB pins 612 coupled from the PCB 610 to a ground trace in a host printed circuit board. The housing/shielding unit 715 or 715' is part of the chassis ground and electrically isolated from the signal ground. The housing/shielding unit 715 or 715' couples to chassis ground of a host system through one or more of the fingers 712. The one or more fingers 712 couple to a host panel near a host panel opening through which the fiber-optic module may extend. The fingers 712 contact the host panel opening and effectively reduce the size of the opening through which radiated electromagnetic energy may escape to seal the host panel opening through which the fiber-optic module may protrude. With the housing/shielding unit 715 or 715' coupled to chassis ground, it acts as a plug to block EMI radiated emissions from escaping. Additionally, the smaller the host panel opening, the greater the shielding effectiveness as the host system begins to resemble a Faraday cage.

The fiber-optic module 700 of the invention includes a housing/shielding unit 715 or 715', and a module chassis frame 120 or 120'. The optic, electronic, and opto-electronic components of the fiber-optic module are placed into the module chassis frame 120. These components and their assembly were previously described with reference to FIG. 6 and the fiber-optic module 100 and are not repeated again for brevity. When the housing/shielding unit 715 or 715 is assembled around the module chassis frame and the optic, electronic, and opto-electronic components affixed thereto, it can couple to the flap 625 of the U-plate 624 so that it an be electrically grounded to chassis ground. Additionally, the U-plate 624 can couple to the shielding collars 622A and 622B. This can electrically connect the collars 622A and 622B, the U-plate 624 and the housing/shielding unit 715 or 715' together if all are formed of conductive materials. Assuming they are electrically connected, grounding the housing/shielding unit 715 or 715' to chassis ground of a host system can also couple chassis ground into the U-plate 624 and the shielding collars 622A and 622B for electromagnetic shielding externally as well as internally.

After all the components have been attached to the module chassis frame 120 or 120', the housing/shielding unit 715 or 715' can then be assembled around it. Assembly of the housing/shielding unit 715 or 715' around the module chassis frame 120 can be performed in the same ways previously described for the housing/shielding unit 115 or 115'.

Figure 11A:
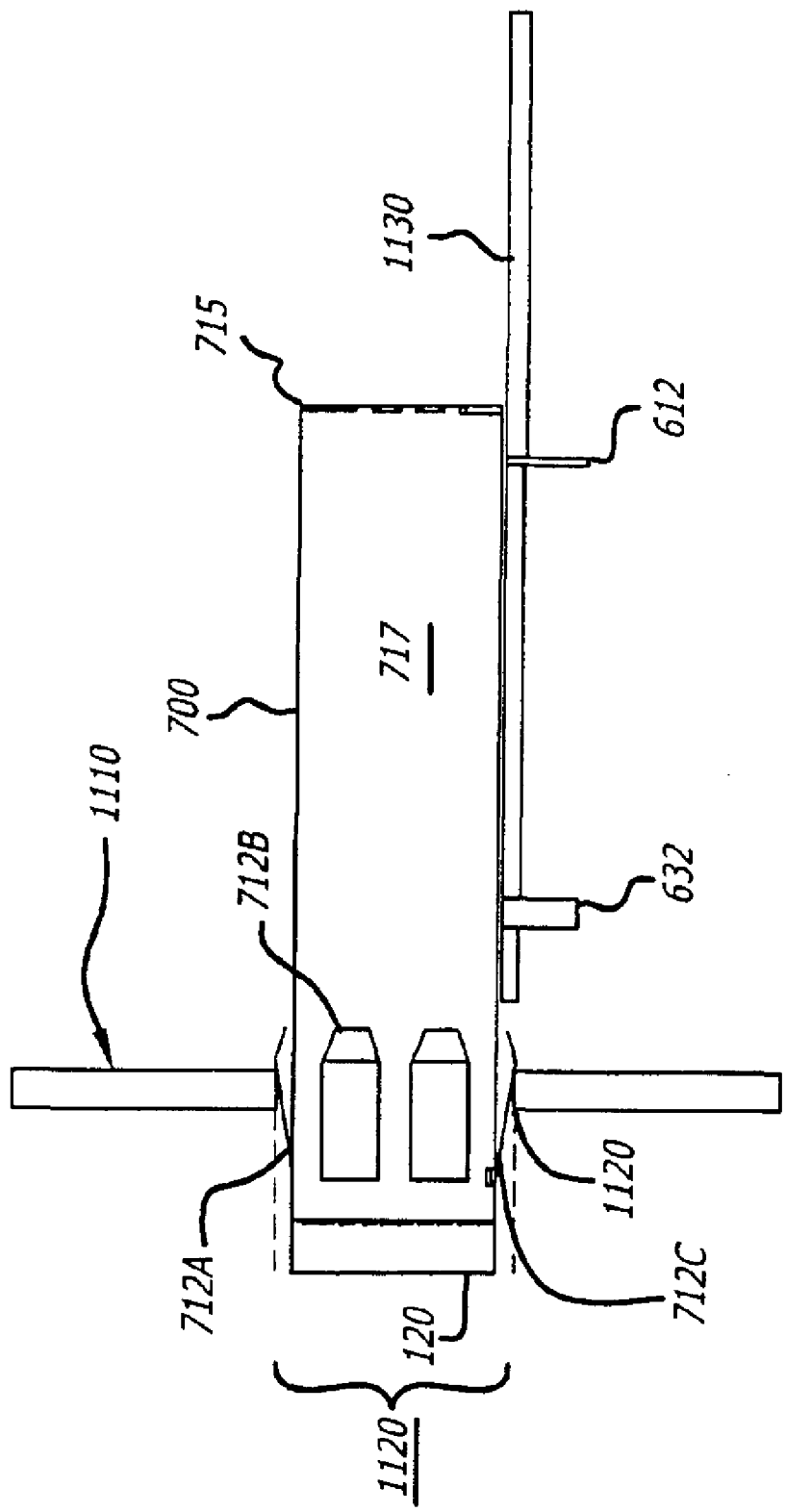
FIG. 11A is a side view of the second embodiment of the fiber-optic module of FIGS. 10A and 10B mounted within a host system.
Figure 11B:
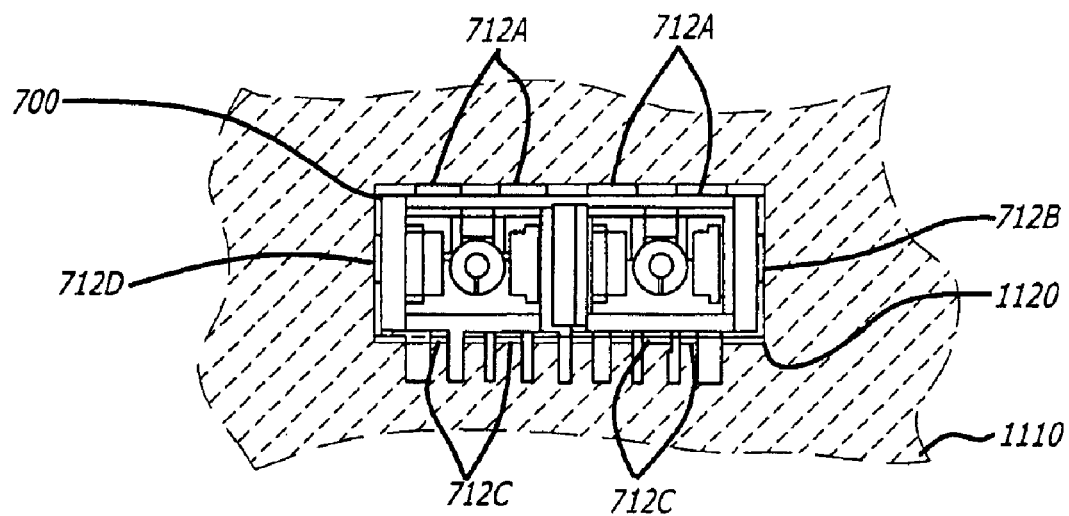
FIG. 11B is a front view of the second embodiment of the fiber-optic module of FIGS. 10A and 10B mounted within a host system (panel 1110 of the host system shown in dashed lines).

Referring now to FIGS. 11A and 11B, a magnified side view and a magnified frontal view of the fiber-optic module 700 within a host system is illustrated. The fiber-optic module 700 includes a backward shield which is provided by the one-piece or single-piece integrated housing/shielding unit 715 or 715'. The fiber-optic module 700 with the one-piece or single-piece integrated housing/shielding unit 715 or 715' provides an extended mount as illustrated by its nose extending beyond a bezel or faceplate. The host system may be a hub, switch, bridge, server, personal computer, or other network or electronic equipment desiring to connect to a communication system using an fiber-optic module. The fiber-optic module 700 is coupled to a printed circuit board 1130 within the host system. A bezel or faceplate 1110 of the host system has a transceiver opening 1112 through which the nose of the fiber-optic module extends when its coupled to the host system. The transceiver opening 1120 of the bezel 1110 is sized to appropriately mate with the fingers 712 of the fiber-optic module 700. The opening 1120 has an inner surface 1114 which mates with the fingers 712 to make an electrical coupling. By making contact to the inner surface 1114, a backside surface of the bezel 1110 can be insulated to avoid shorting an electrical component that might make contact thereto. When the nose of the fiber-optic module is inserted into the opening 1112 or the opening 1112 is threaded over the nose of the fiber-optic module 700, the fingers 712 compress towards the fiber-optic module when mating with the inner surface 1114 and expand outward to form a tight mechanical fit and a reliable electrical connection. The expansion of the fingers 712 outward effectively make the opening 1120 smaller through which radiated electromagnetic energy might otherwise escape. The fingers 712 also deter the nose of the fiber-optic module 700 from extending excessively out through the opening 1120 of the bezel 1110. With the bezel 1110 grounded by the chassis of the host system, the housing/shielding unit 715 of the fiber-optic module can be grounded by one or more fingers 712 coupling to the inner surface 1114 of the opening 1120. Alternatively, the housing/shielding unit 715 of the transceiver 700 can be grounded through a pin or other connection coupled to the PCB 1130 of the host system.

Figure 12B:
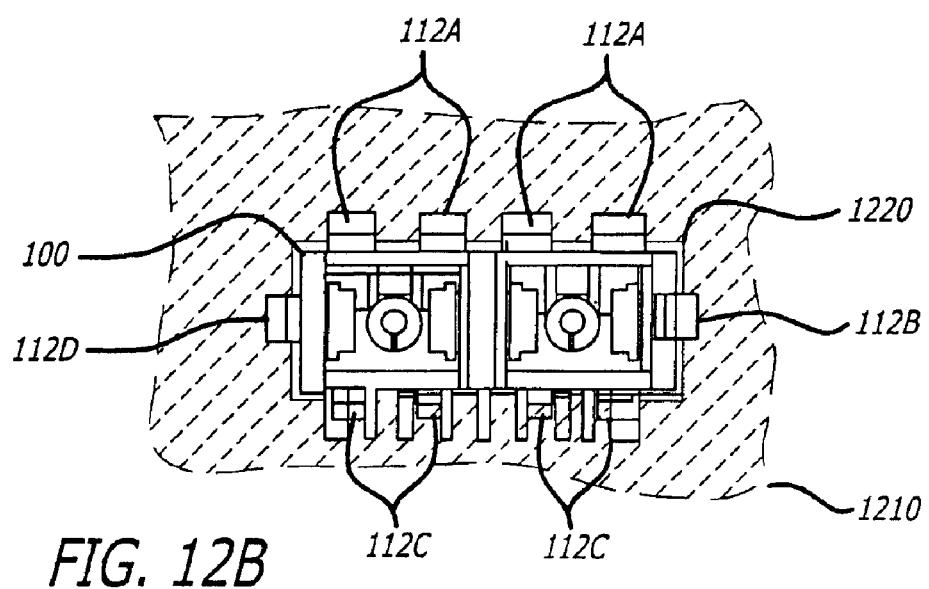
FIG. 12B is a front view of the first embodiment of the fiber-optic module of FIG. 6 mounted within a host system (panel 1210 of the host system shown in dashed lines).
Figure 12A:
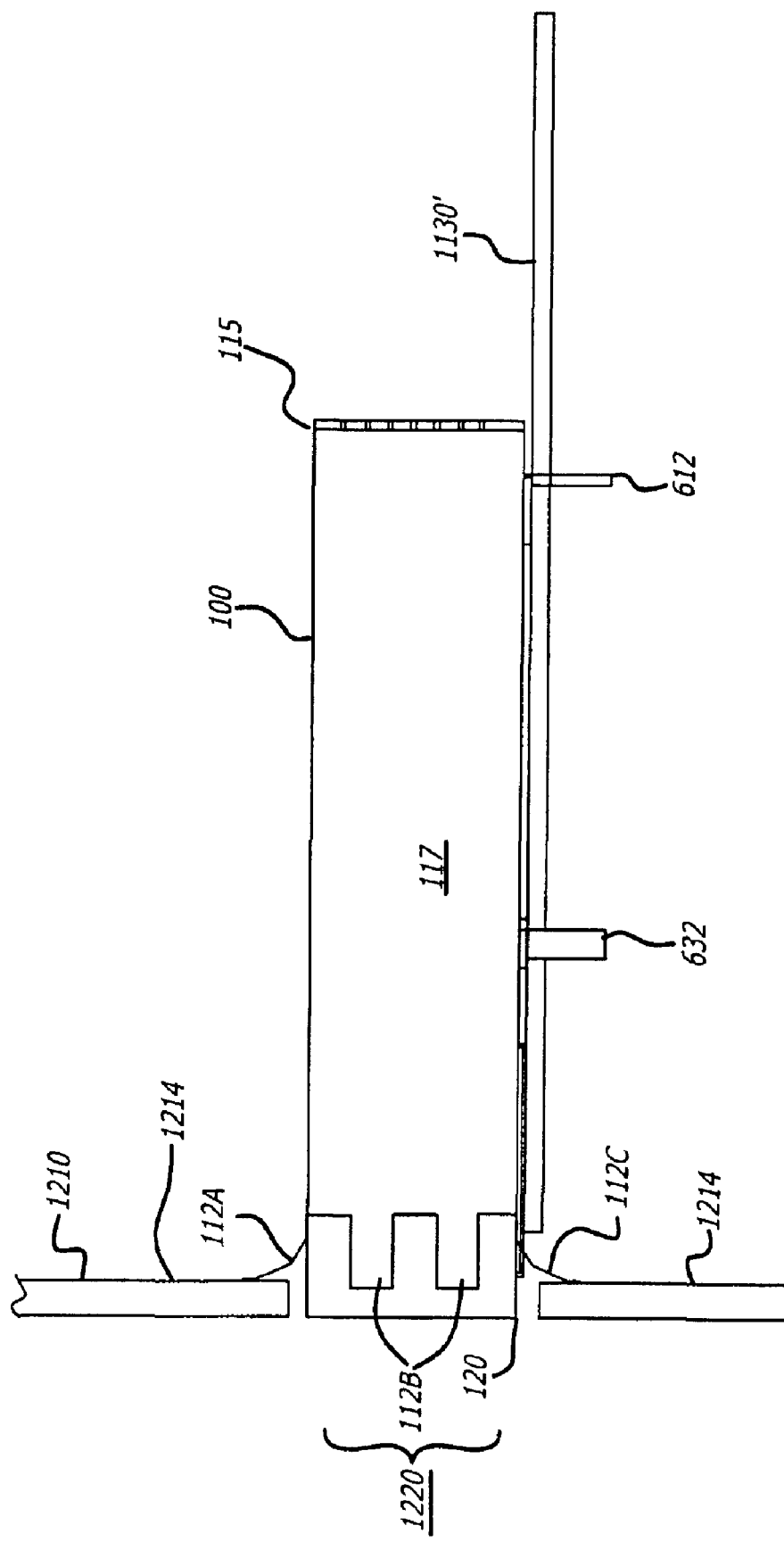
FIG. 12A is a side view of the first embodiment of the fiber-optic module of FIG. 6 mounted within a host system.

Referring now to FIGS. 12A and 12B, a magnified side view and a magnified frontal view of the fiber-optic module 100 within a host system is illustrated. The host system may be a switch, bridge, a server, personal computer, or other network or electronic equipment desiring to connect to a communication system using an fiber-optic module. The fiber-optic module 100 is coupled to a printed circuit board 1130 within the host system. A bezel or faceplate 1210 of the host system has a transceiver opening 1220 through which the nose of the fiber-optic module partially extends when coupled to the host system. The fiber-optic module 100, a forward shield configuration with the one-piece or single-piece integrated housing/shielding unit 115 or 115', provides a flush mount as illustrated by FIG. 12A. The transceiver opening 1220 of the bezel 1210 is sized appropriately to allow insertion of a fiber-optic connector into the fiber-optic module 100. The bezel or faceplate 1210 of the host system has a backside surface 1214 to which the fingers 112 can make an electrical and a mechanical coupling. Furthermore, the fingers 112 deter the EMI of both the fiber-optic module 100 and the host system board 1130 from extending excessively out through the transceiver opening 1212 of the bezel 1210. When the nose of the fiber-optic module is inserted into the opening 1112 or the opening 1112 is threaded over the nose of the fiber-optic module 100, one or more of the fingers 112 couple to the back side surface 1214 around the opening 1212 of the bezel 1210. With the bezel 1210 grounded by the chassis of the host system, the housing/shielding unit 115 of the fiber-optic module 100 can be grounded by one or more fingers 112 coupling to the back side surface 1214 of the bezel 1210. Alternatively if the bezel is coupled to a chassis ground trace, the housing/shielding unit 115 or 115' of the fiber-optic module 100 can be grounded through a pin or other grounding feature that is coupled to a chassis ground trace of the PCB 1130 of the host system commonly coupled to the bezel.

Figure 13:
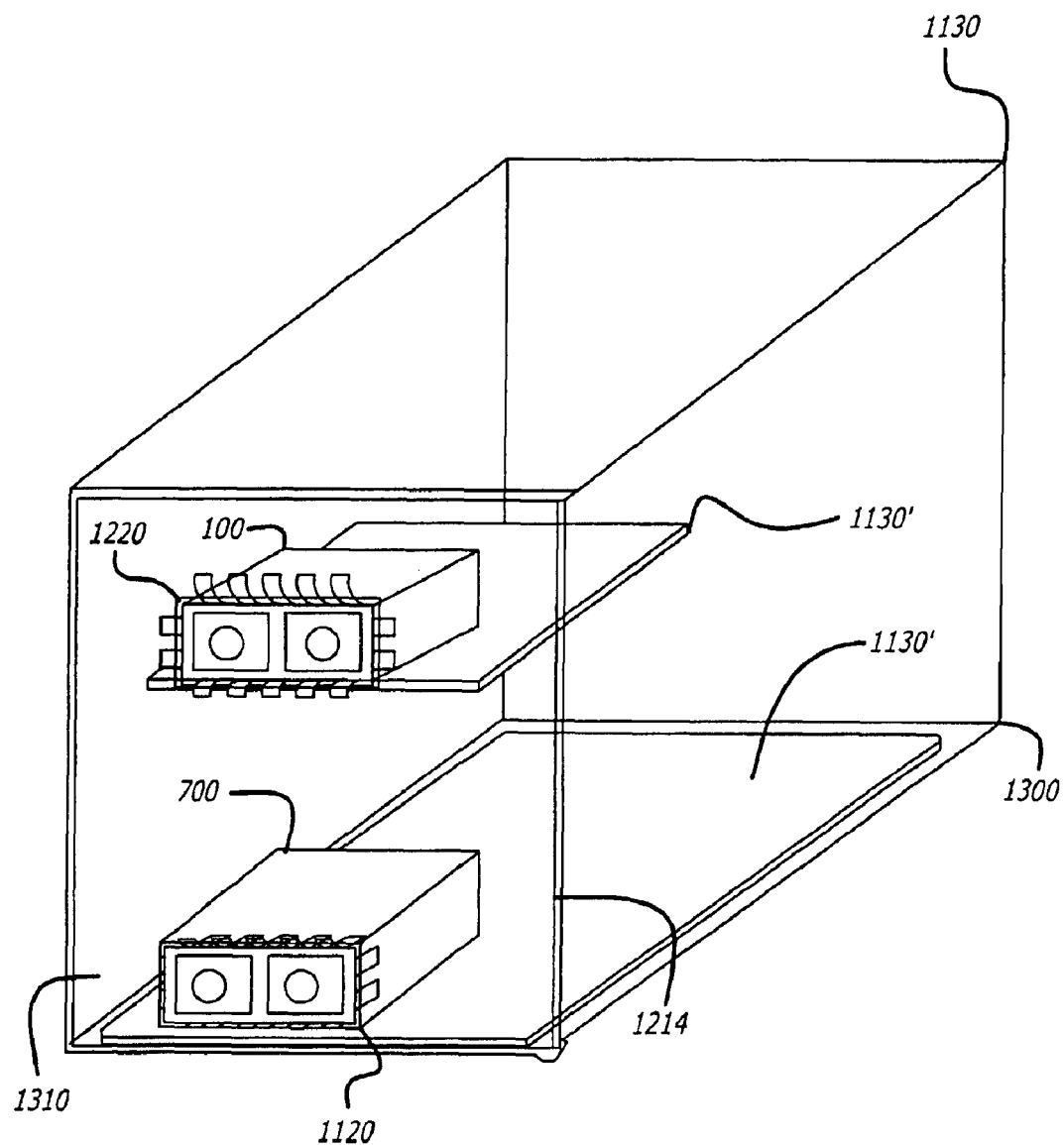
FIG. 13 is a perspective view of a host system incorporating embodiments of the fiber-optic modules of the invention.

Referring now to FIG. 13, an exemplary host system 1300 is illustrated having the fiber-optic module 100 and the fiber-optic module 700. The host system 1300 has a bezel, a faceplate or a host panel 1310 with opening 1120 and opening 1220 for the fiber-optic module 700 and the fiber-optic module 100 respectively. The fiber-optic module 700 is coupled to host printed circuit board 1130. The fiber-optic module 100 is coupled to host printed circuit board 1130'. The host printed circuit boards 1130 and 1130' may include a ground plane on a top surface or bottom surface under the area of the fiber optic module 100 and 700 in order to provide additional electromagnetic shielding. With openings 1120 and 1220 being relatively small encompassed by the housing/shielding unit 715 or 715' of the fiber-optic module 700 and the housing/shielding unit 115 or 115' of the fiber-optic module 100 respectively, the host system 1300 begins to resemble a Faraday cage. The housing/shielding unit 115, 115', 715, 715' effectively seals openings 1120 and 1220 in the host panel 1310 to deter electromagnetic radiation from leaking into or out of the host system. The one or more fingers 112 of the housing/shielding unit 115 or 115' can surround the opening 1220. The one or more fingers 112 of the housing/shielding unit 115 or 115' can expand into the opening 1120. With the housing/shielding unit 115 or 115' coupled to chassis ground, it acts as a plug to block EMI radiated emissions from escaping.

Most equipment such as the host system 1300 utilizing high-speed fiber-optic modules are required to meet the requirements of: 1) the FCC in the United States; 2) the CENELEC EN55022 (CISPR 22) specification in Europe; and 3) the VCCI in Japan. The fiber-optic modules 100 and 700 are designed to perform to these specified limits of EMI including complying with FCC Class B limits. The fiber-optic modules 100 and 700 are also designed to provide good noise immunity from externally generated radio-frequency electromagnetic fields. Key components in the fiber-optic modules 100 and 700 to achieve good electromagnetic compliance (EMC) for EMI and external noise immunity are the internal shields (shielding collars 622A and 622B and the U-Plate 624), and a metal or conductive housing/shielding unit 115, 115', 715 or 715' with fingers 112 or 712 respectively of the fiber-optic modules 100 and 700.

The fiber-optic modules 100 and 700 are further designed to meet Class 1 eye safety and comply with FDA 21CFR1040.10 and 1040.11 and the IEC 825-1.

Referring now to FIGS. 14–17C, methods of forming the housing/shielding units 115' and 715' out of a sheet of a material layer and assembly with the module chassis frame 120 or 120' is illustrated.

Figure 14:
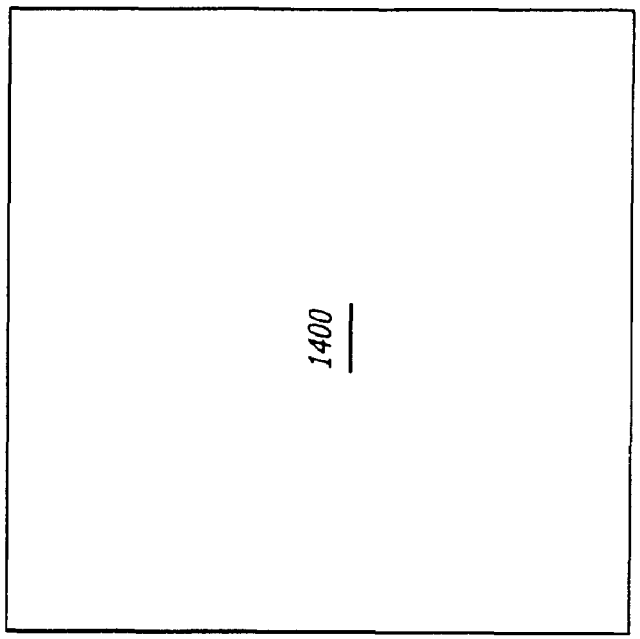
FIG. 14 illustrates a starting sheet of material for the embodiments of the housing/shielding unit.

In FIG. 14, a starting sheet of a layer of material 1400 for the housing/shielding units 115, 115', 715 and 715' is illustrated. The sheet of material 1400 is a conductive material and can be a metal, a plated plastic, a conductive plastic or other known type of electrically conductive material. A first step in the process is to stamp, etch or cut the patterns for the housing/shielding unit 115, 115', 715 or 715' out of the sheet of material 1400.

Figure 15A:
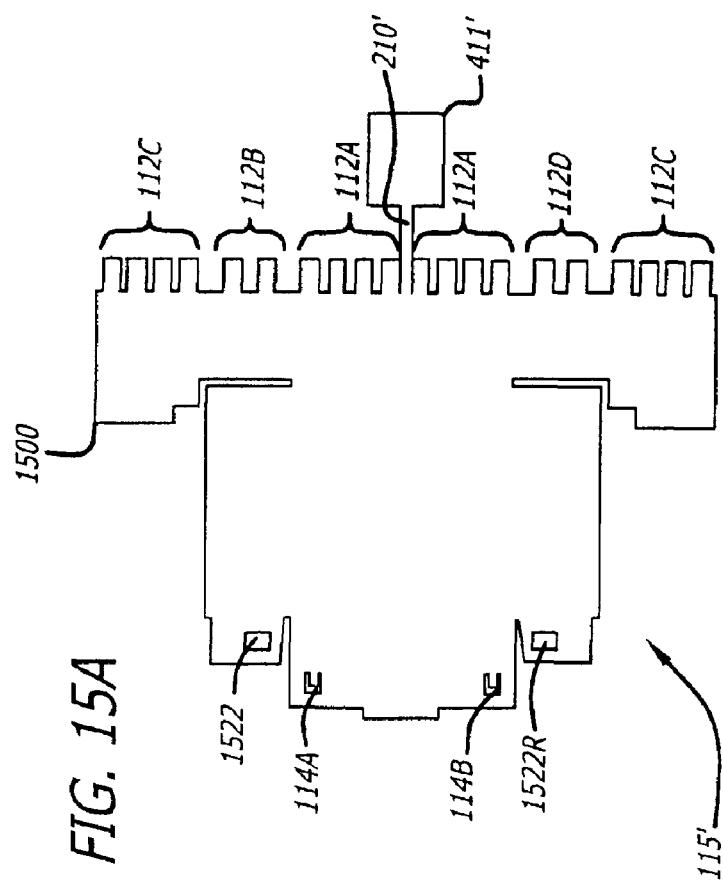
FIG. 15A illustrates an unfolded flat pattern layout for an embodiment of the housing/shielding unit.

Referring now to FIG. 15A, an unfolded flat pattern layout 1500 for the housing/shielding unit 115' is illustrated. The unfolded flat pattern layout 1500 is a patterned material layer for the housing/shielding unit 115' formed out of the starting sheet of the layer of material 1400. In the unfolded flat pattern layout 1500, the forward fingers 112, tangs 114A and 114B, strap 210 and the septum 411' of the housing/shielding unit 115' are easily discernable. A pair of left and right window openings 1522L and 1522R are also visible in the unfolded flat pattern layout 1500.

Figure 15B:
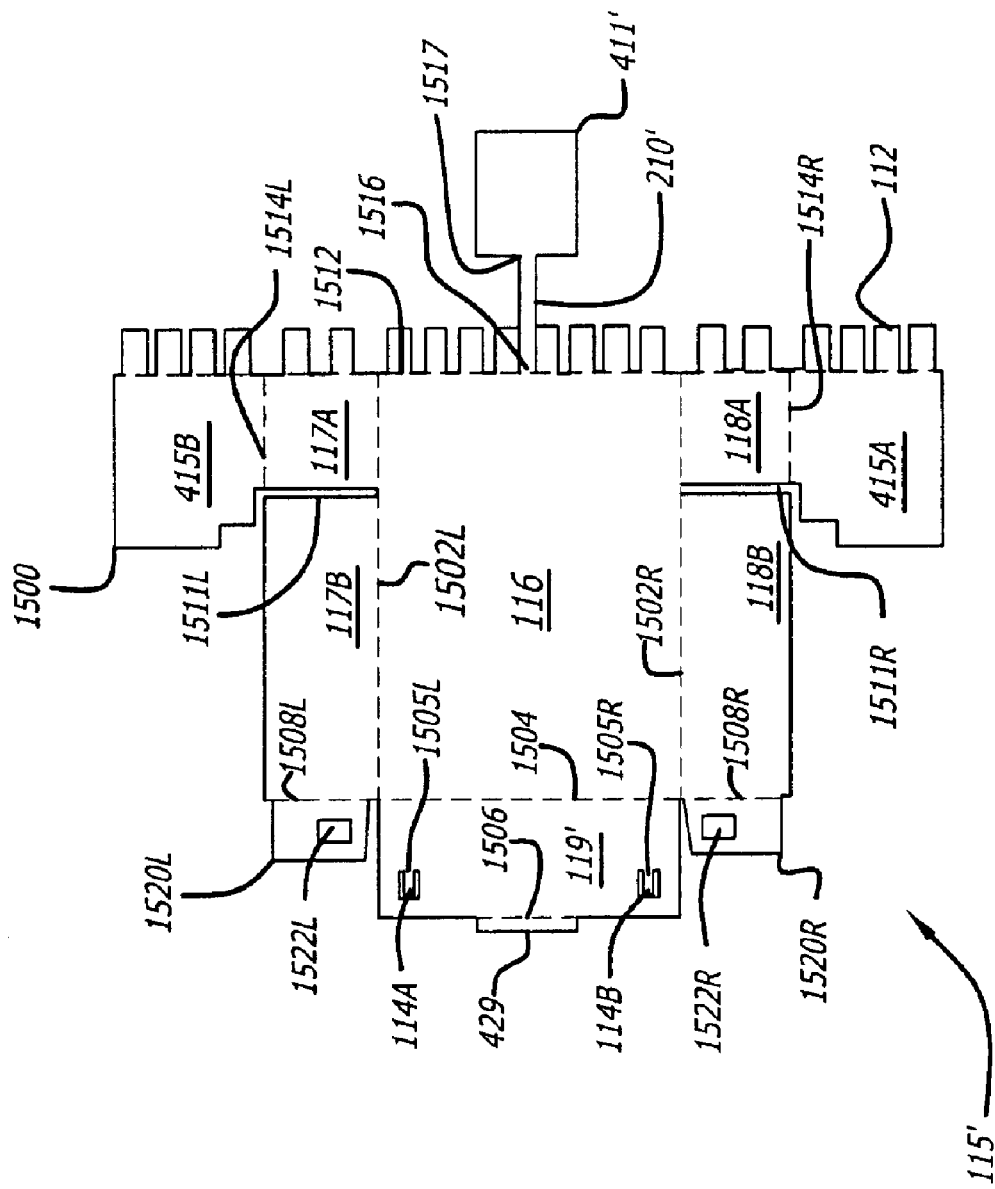
FIG. 15B illustrates fold and bend lines on the unfolded flat pattern layout of FIG. 15A.

Referring now to FIG. 15B, fold/bend lines are illustrated on the unfolded flat pattern layout 1500 to form the housing/shielding unit 115'. A slightly alternate pattern and alternate fold/bend lines can be utilized to form the housing/shielding unit 115. The fold/bend lines illustrated on the unfolded flat pattern layout 1500 make other features and components of the housing/shielding unit 115' discernable. The fold/bend lines illustrated in FIG. 15B include left flap and right flap fold lines 1502L and 1502R, a back flap fold line 1504, left and right tang fold lines 1505L and 1505R, a retaining flap fold line 1506, left wing and right wing fold lines 1508L and 1508R, finger base bend line 1512, left bottom flap and right bottom flap fold lines 1514L and 1514R, a strap fold line 1516, and a septum fold line 1517.

A left wing 1520L and a right wing 1520R include tang window openings 1522L and 1522R respectively. The tangs 114A and 114B mate with the tang window openings 1522L and 1522R respectively to hold the left wing and right wing coupled to the back side 119' after folding. The septum 411' is coupled to the right bottom flap 415A and the left bottom flap 415B with an adhesive or a weld to hold the housing/shielding unit and the module chassis frame assembled together.

The left wing fold line 1508L defines the left wing 1520L from the left side flap 117B. The right wing fold line 1508R defines the right wing 1520R from the right side flap 118B. The right side fold line 1502R and the right side slit 1511R defines right flaps 118A and 118B from the top side 116. The left side fold line 1502L and the left side slit 1511L defines left flaps 117A and 117B from the top side 116. The right bottom flap fold line 1514R defines the right bottom flap 415A. The left bottom flap fold line 1514L defines the left bottom flap 415B. The retaining flap fold line 1506 defines a retaining flap 429 coupled to the back side flap 119'.

The fold/bend lines illustrated on the unfolded flat pattern layout 1500 are folded and/or bent to form the housing/shielding unit 115' as illustrated in FIG. 4B. Generally, the folds along fold lines are made at nearly a ninety degree angle but for the fold lines of the tangs 114A and 114B and fingers. The fingers 112 may be first bent or lastly bent to curve outward along the bend lines 1512. The left flaps 117A and 117B and the right flaps 118A and 118B may be the next to be folded or they may be the first to be folded along fold lines 1502L and 1502R. The right bottom flap 415A and the left bottom flap 415B are next folded along the right bottom flap fold line 1514R and the left bottom flap fold line 1514L respectively. The next sequence of fold/bend steps can depend upon the method of assembly of the fiber-optic module utilized.

In a first case, the front of the housing/shielding unit 115' is assembled first. In this case, the septum 411' is folded along fold line 1517 and then the strap 210' is folded along fold line 1516. This is followed by the left wing 1520L and the right wing 1520R being folded along the left wing fold line 1508L and the right wing fold line 1508R respectively; the back side flap 119' being folded along the fold line 1504; the tangs 114A and 114B being folded along fold lines 1505L and 1505R respectively; and the retaining flap 429 being folded along the retaining flap fold line 1506.

In a second case, the rear of the housing/shielding unit 115' is assembled first. In this case, the left wing 1520L and the right wing 1520R are folded along the left wing fold line 1508L and the right wing fold line 1508R respectively; the back side flap 119' is folded along the fold line 1504; the tangs 114A and 114B are folded along fold lines 1505L and 1505R respectively; and the retaining flap 429 is folded along the retaining flap fold line 1506. This is followed by the septum 411' being folded along fold line 1517 and then the strap 210' folded along fold line 1516.

In yet another case for assembly of the fiber-optic module, either order of assembly in the first or second case can be utilized or mixed together. The one or more fingers 112 may alternately be bent outward from a frontal opening the into their curved shape as a last step in the folding/bending process.

A slightly alternate pattern of the layout 1500 with alternate fold/bend lines is utilized to fold and bend into shape to form the housing/shielding unit 115 as illustrated in FIGS. 1–3, 4A, 5 and 12A.

Figure 15C:
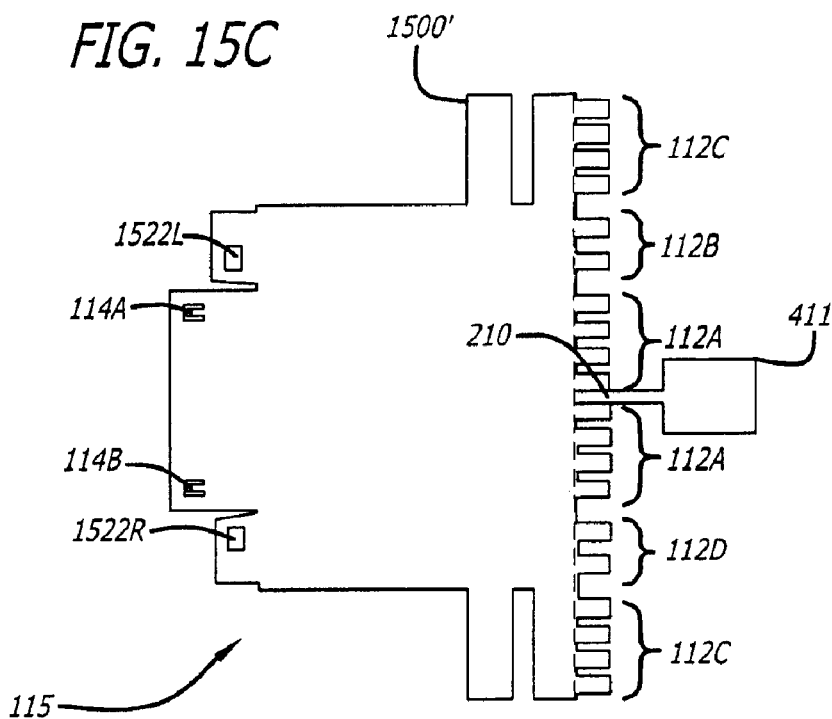
FIG. 15C illustrates an unfolded flat pattern layout for an embodiment of the housing/shielding unit.

Referring now to FIG. 15C, an unfolded flat pattern layout 1500' for the housing/shielding unit 115 is illustrated. The unfolded flat pattern layout 1500 is a patterned material layer for the housing/shielding unit 115 formed out of the starting sheet of the layer of material 1400. In the unfolded flat pattern layout 1500', the forward fingers 112, tangs 114A and 114B, strap 210 and a septum 411 of the housing/shielding unit 115 are easily discernable. The pair of left and right window openings 1522L and 1522R are also visible in the unfolded flat pattern layout 1500'.

Figure 15D:
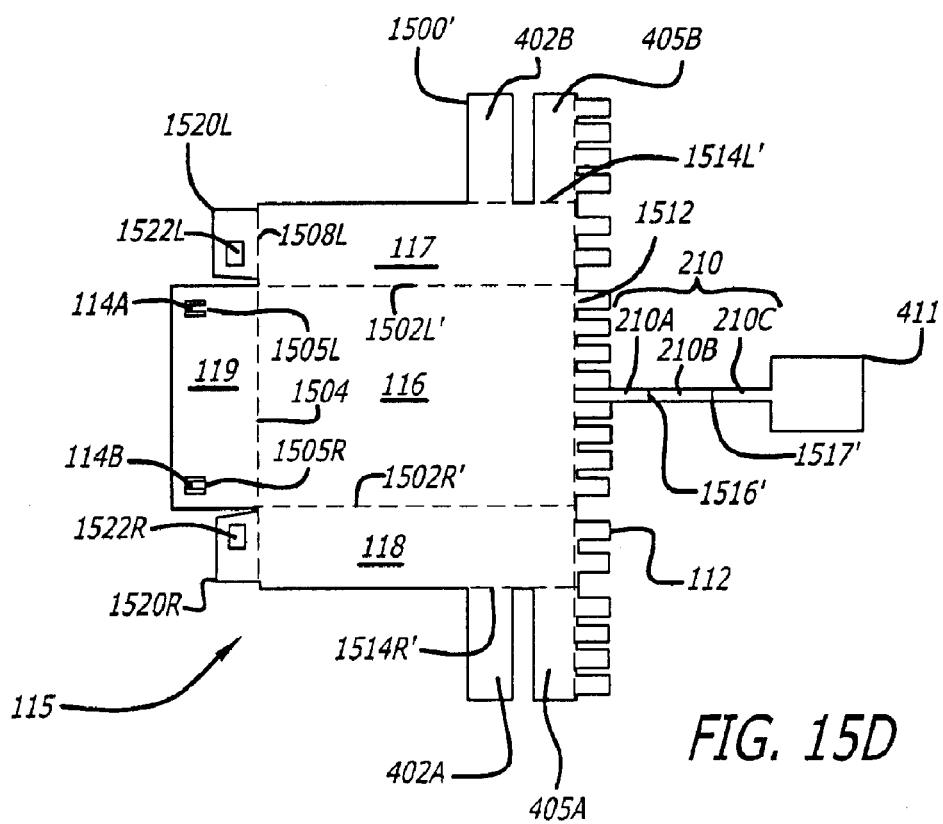
FIG. 15D illustrates fold and bend lines on the unfolded flat pattern layout of FIG. 15C.

Referring now to FIG. 15D, fold/bend lines are illustrated on the unfolded flat pattern layout 1500' to form the housing/shielding unit 115. The fold/bend lines illustrated on the unfolded flat pattern layout 1500' make other features and components of the housing/shielding unit 115 discernable. The fold/bend lines illustrated in FIG. 15D include left flap and right flap fold lines 1502L' and 1502R', a back flap fold line 1504, left and right tang fold lines 1505L and 1505R, left wing and right wing fold lines 1508L and 1508R, finger base bend line 1512, left bottom flap and right bottom flap fold lines 1514L' and 1514R', a first strap fold line 1516', and a second strap fold line 1517'.

The fold bend lines of the unfolded flat pattern layout 1500' are similar to the fold/bend lines of the unfolded flat pattern layout 1500 but for left flap and right flap fold lines 1502L' and 1502R', left bottom flap and right bottom flap fold lines 1514L' and 1514R', a first strap fold line 1516', and a second strap fold line 1517'.

The right side fold line 1502R' defines the right flap 118 from the top side 116. The left side fold line 1502L' defines left flap 117 from the top side 116. The right bottom flap fold line 1514R' defines the right bottom flaps 402A and 405A. The left bottom flap fold line 1514L' defines the left bottom flaps 402B and 405B. The back fold line 1504 defines the back side flap 119 from the top side 116.

The first strap fold line 1516' and the second strap fold line 1517' define the first extension portion 210A, the wrap portion 210B and the second extension portion 210C of the strap 210. The strap 210 is folded along the first strap fold line 1516' and the second strap fold line 1517'. The septum 411 can couple to the right bottom flaps 402A and 405A and the left bottom flaps 402B and 405B with an adhesive or a weld to hold the housing/shielding unit and the module chassis frame assembled together.

The fold/bend lines illustrated on the unfolded flat pattern layout 1500' are folded and/or bent to form the housing/shielding unit 115 as illustrated in FIGS. 1, 2, 3, and 4A. Generally, the folds along fold lines are made at nearly a ninety degree angle but for the fold lines of the tangs 114A and 114B and fingers 112. The fingers 112 may be first bent or lastly bent to curve outward along the bend lines 1512. The left flap 117 and the right flap 118 may be the next to be folded or they may be the first to be folded along fold lines 1502L' and 1502R'. The right bottom flaps 402A and 405A and the left bottom flaps 402B and 405B are next folded along the right bottom flap fold line 1514R' and the left bottom flap fold line 1514L' respectively. The next sequence of fold/bend steps can depend upon the method of assembly of the fiber-optic module utilized. These were previously described with reference to the unfolded flat pattern layout 1500 of FIG. 15B.

Figure 16A:
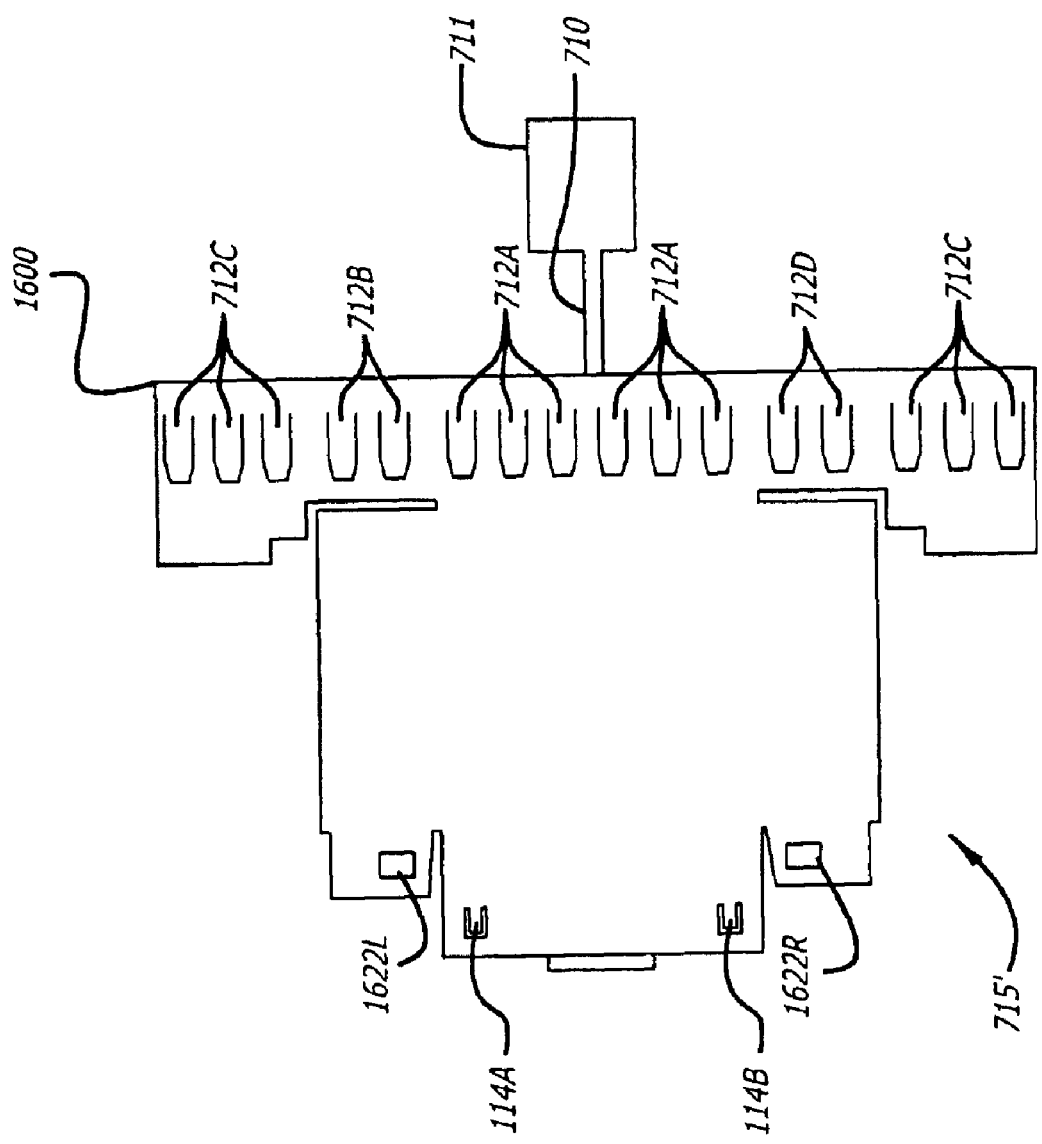
FIG. 16A illustrates an unfolded flat pattern layout for an embodiment of the housing/shielding unit.

Referring now to FIG. 16A, the unfolded flat pattern layout 1600 for the housing/shielding unit 715' is illustrated. The unfolded flat pattern layout 1600 is a patterned material layer for the housing/shielding unit 715' formed out of the starting sheet of the layer of material 1400. In the unfolded flat pattern layout 1600, the backward fingers 712, tangs 114A and 114B, strap 710 and the septum 711 of the housing/shielding unit 715' are easily discernable. A pair of left and right window openings 1622L and 1622R are also visible in the unfolded flat pattern layout 1600.

Figure 16B:
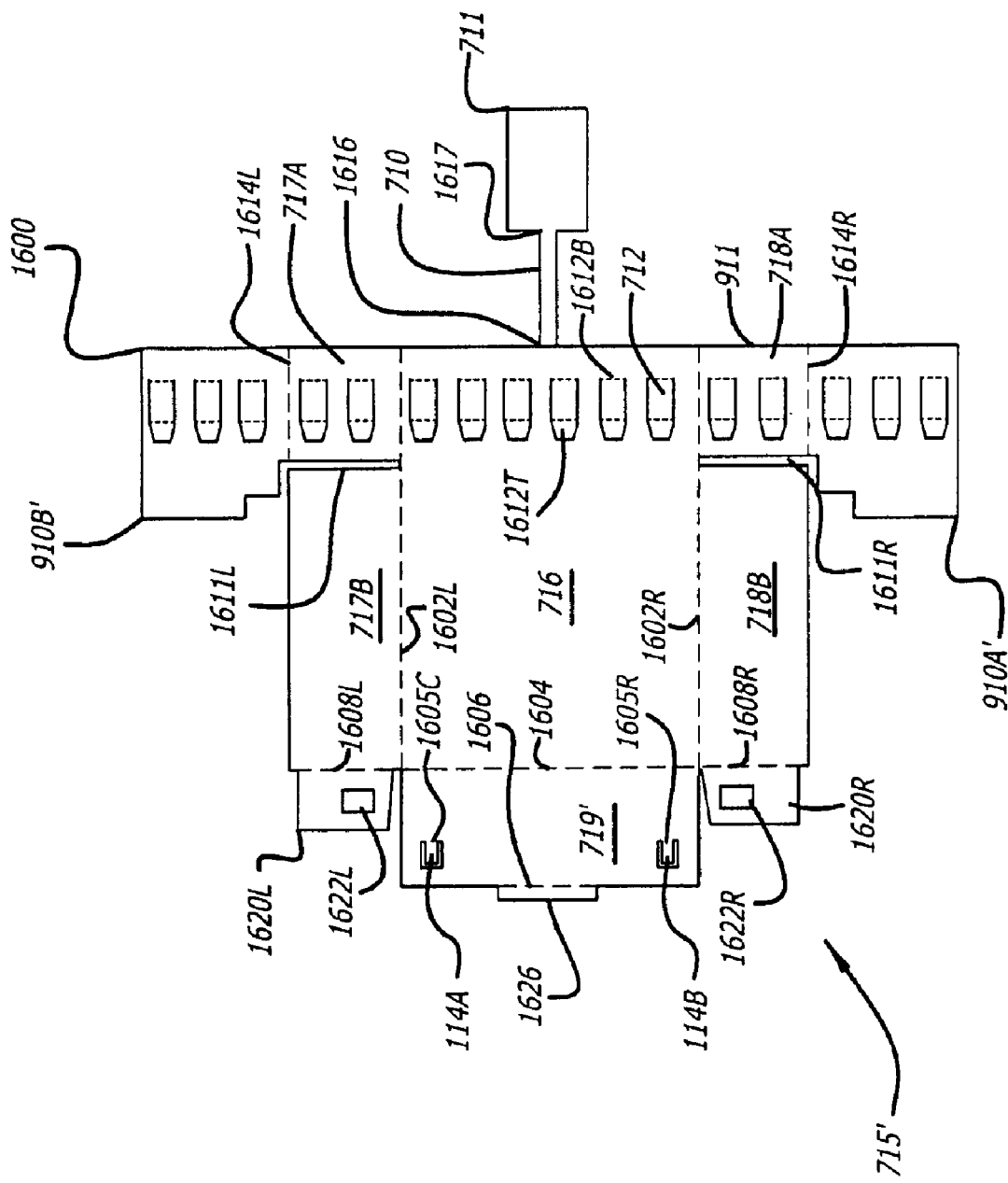
FIG. 16B illustrates fold and bend lines on the unfolded flat pattern layout of FIG. 16A.
Figure 18A:
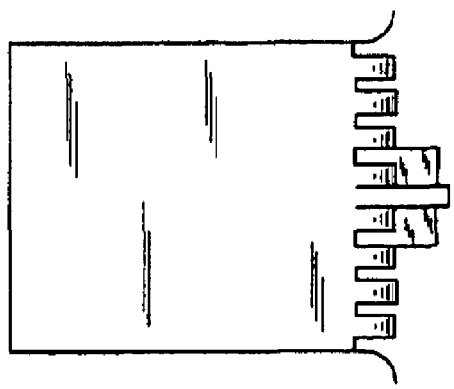
FIG. 18A is a top plan view of a first embodiment of our new design for a one-piece shielded housing.
Figure 18B:
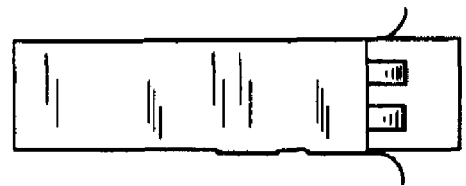
FIG. 18B is a right side elevational view thereof, the left side elevational view being a mirror image.
Figure 18C:
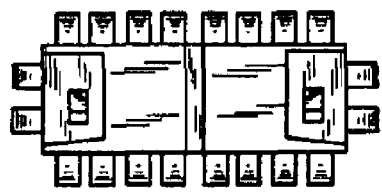
FIG. 18C is a front elevational view thereof.
Figure 18D:
FIG. 18D is a rear elevational view thereof.
Figure 18E:
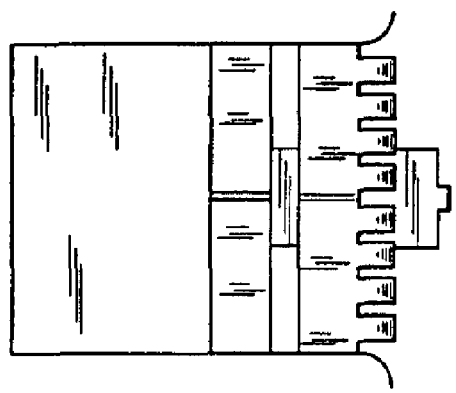
FIG. 18E is a bottom plan view thereof.
Figure 18F:
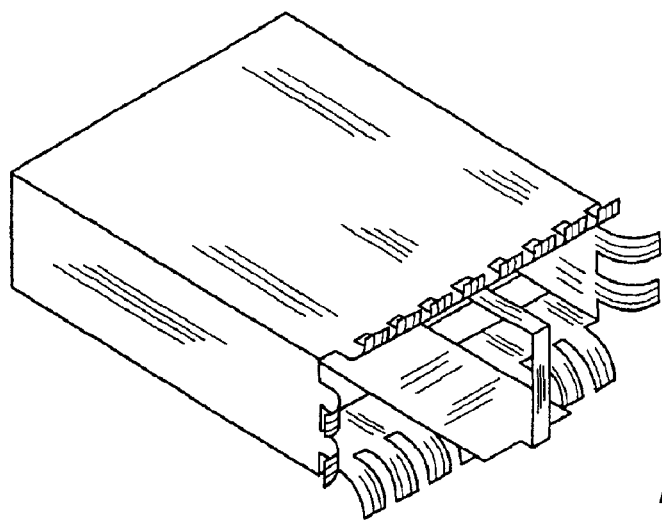
FIG. 18F is a top perspective view thereof.
Figure 19F:
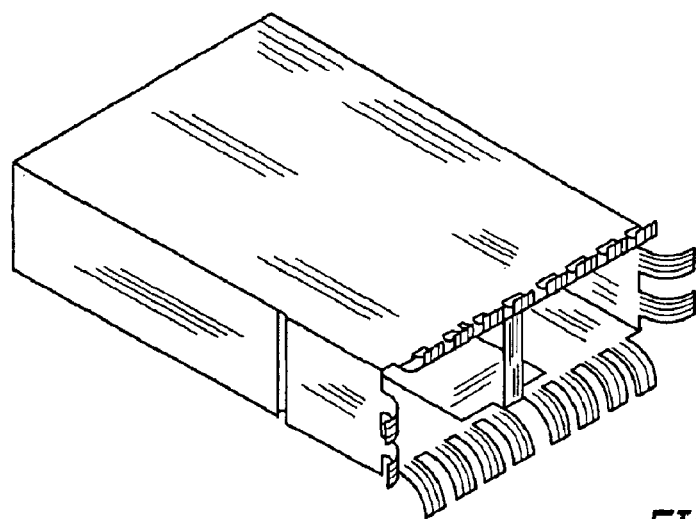
FIG. 19F is a top perspective view thereof.
Figure 20F:
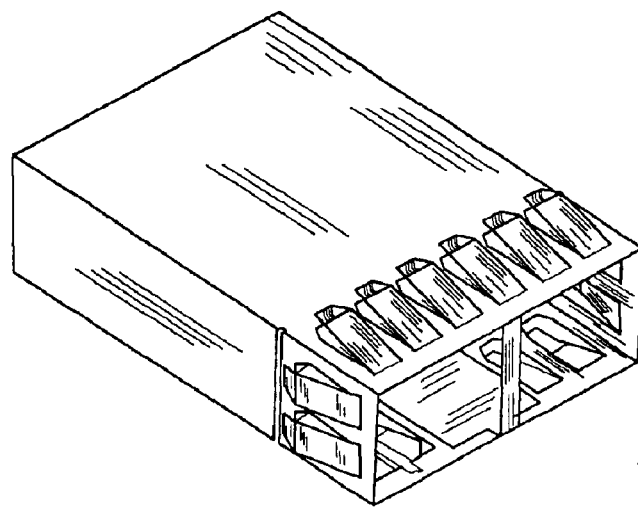
FIG. 20F is a top perspective view thereof.
Figure 18G:
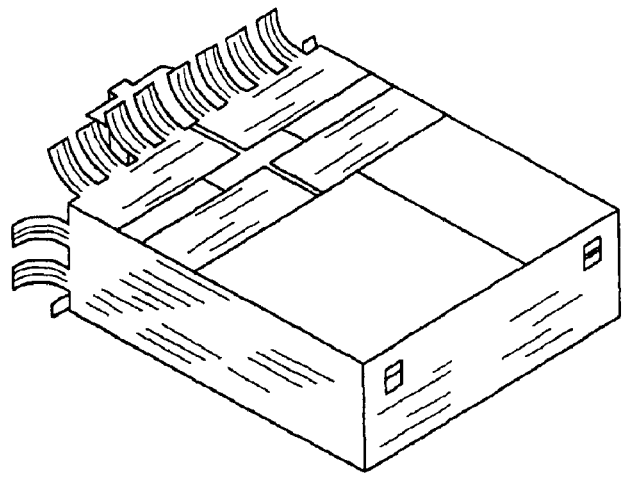
FIG. 18G is a bottom perspective view thereof.
Figure 19G:
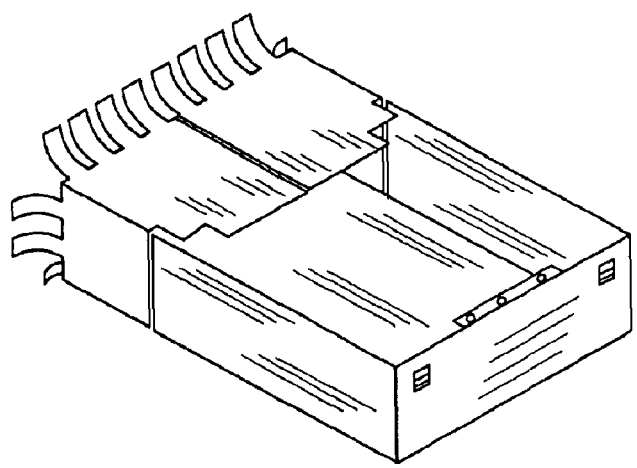
FIG. 19G is a bottom perspective view thereof.
Figure 20G:
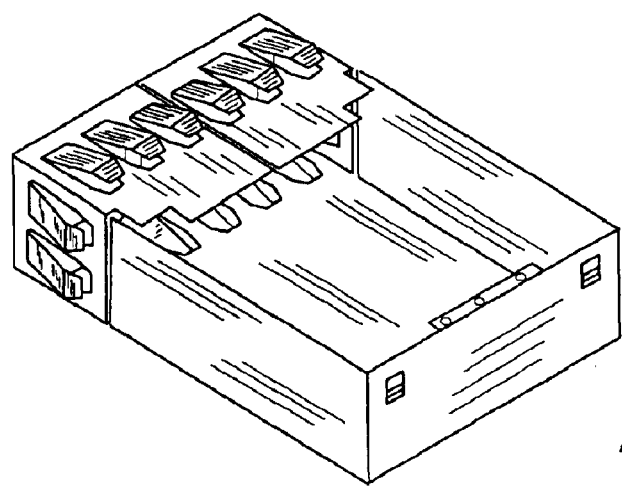
FIG. 20G is a bottom perspective view thereof.
Figure 19A:
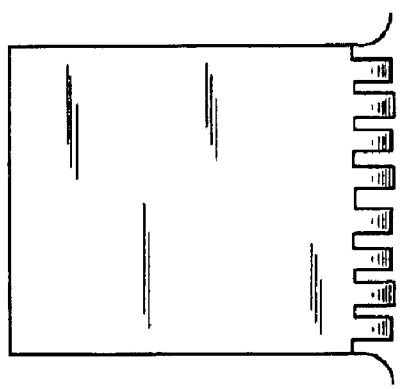
FIG. 19A is a top plan view of a second embodiment of our new design for a one-piece shielded housing.
Figure 19B:
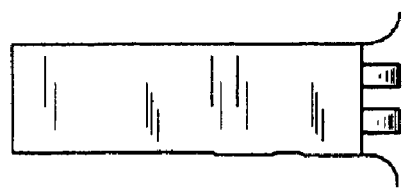
FIG. 19B is a right side elevational view thereof, the left side elevational view being a mirror image.
Figure 19C:
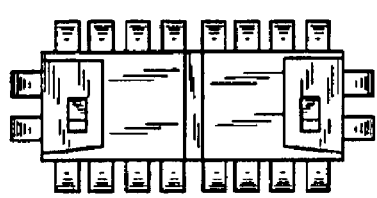
FIG. 19C is a front elevational view thereof.
Figure 19D:
FIG. 19D is a rear elevational view thereof.
Figure 19E:
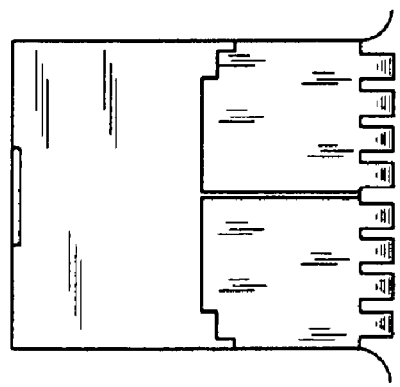
FIG. 19E is a bottom plan view thereof.
Figure 20A:
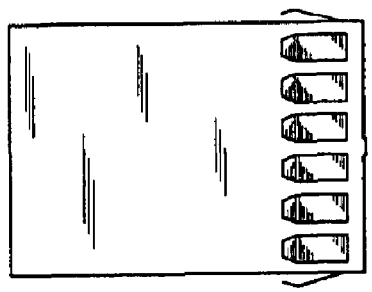
FIG. 20A is a top plan view of a third embodiment of our new design for a one-piece shielded housing.
Figure 20B:
FIG. 20B is a right side elevational view thereof, the left side elevational view being a mirror image.
Figure 20C:
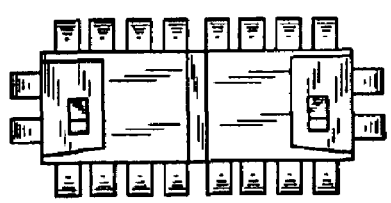
FIG. 20C is a front elevational view thereof.
Figure 20D:
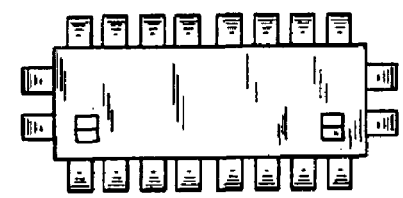
FIG. 20D is a rear elevational view thereof.
Figure 20E:
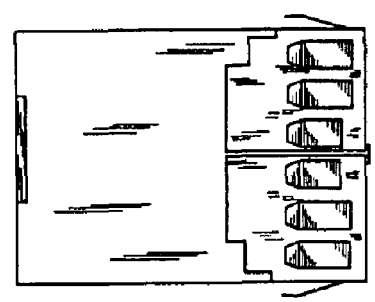
FIG. 20E is a bottom plan view thereof.
Figure 21A:
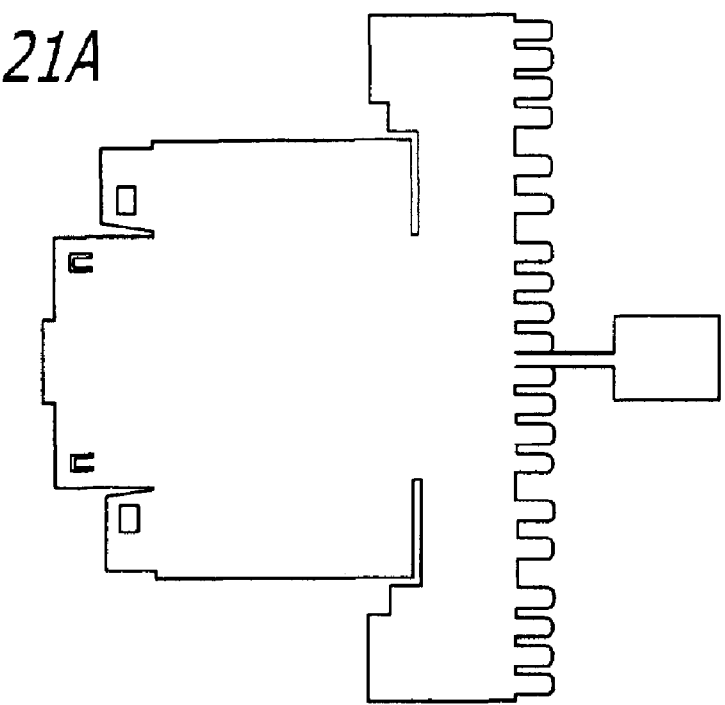
FIG. 21A is a top plan view of a first embodiment of our new design of a patterned material layer for a one-piece shielded housing.
Figure 21B:
FIG. 21B is a front elevational view thereof, the rear elevational view being a mirror image.
Figures 21C, 21D:
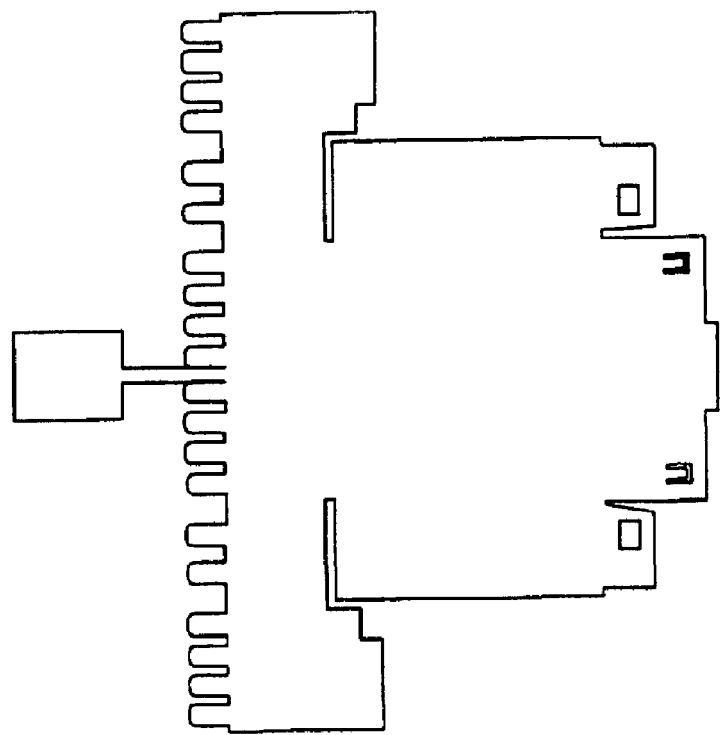
FIG. 21C is a bottom plan view thereof.
FIG. 21D is a right side elevational view thereof, the left side elevational view being a mirror image.
Figure 22A:
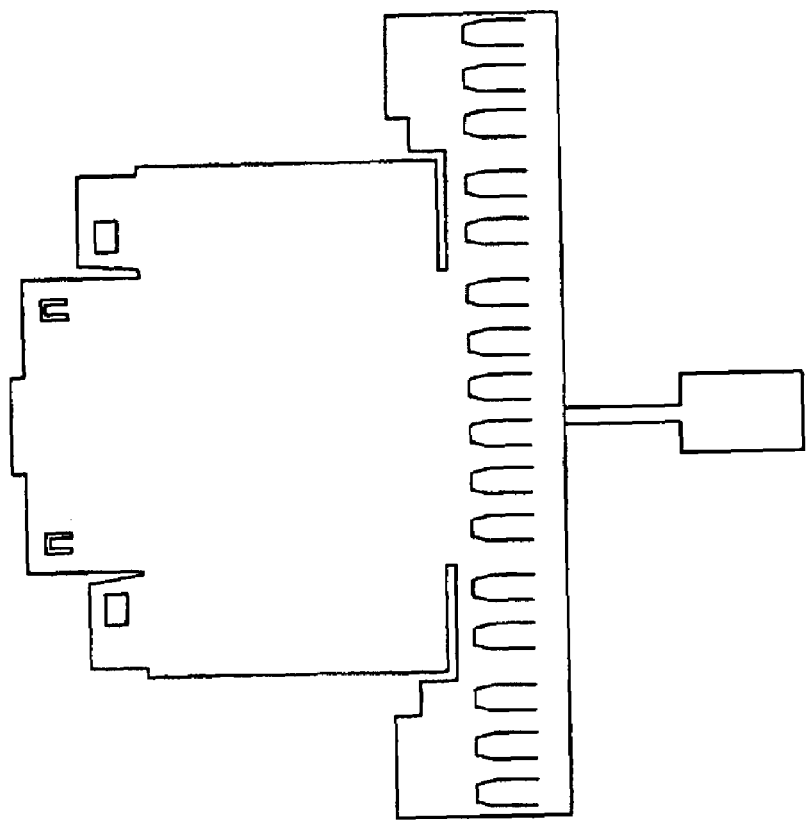
FIG. 22A is a top plan view of a second embodiment of our new design of a patterned material layer for a one-piece shielded housing.
Figure 22B:
FIG. 22B is a front elevational view thereof, the rear elevational view being a mirror image.
Figures 22C, 22D:
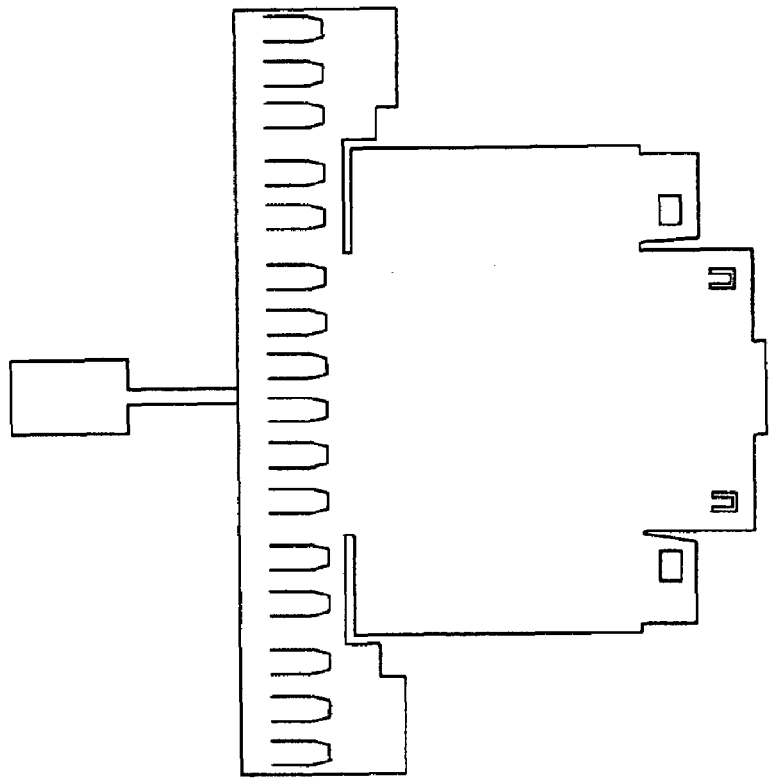
FIG. 22C is a bottom plan view thereof.
FIG. 22D is a right side elevational view thereof, the left side elevational view being a mirror image.
Figure 23:
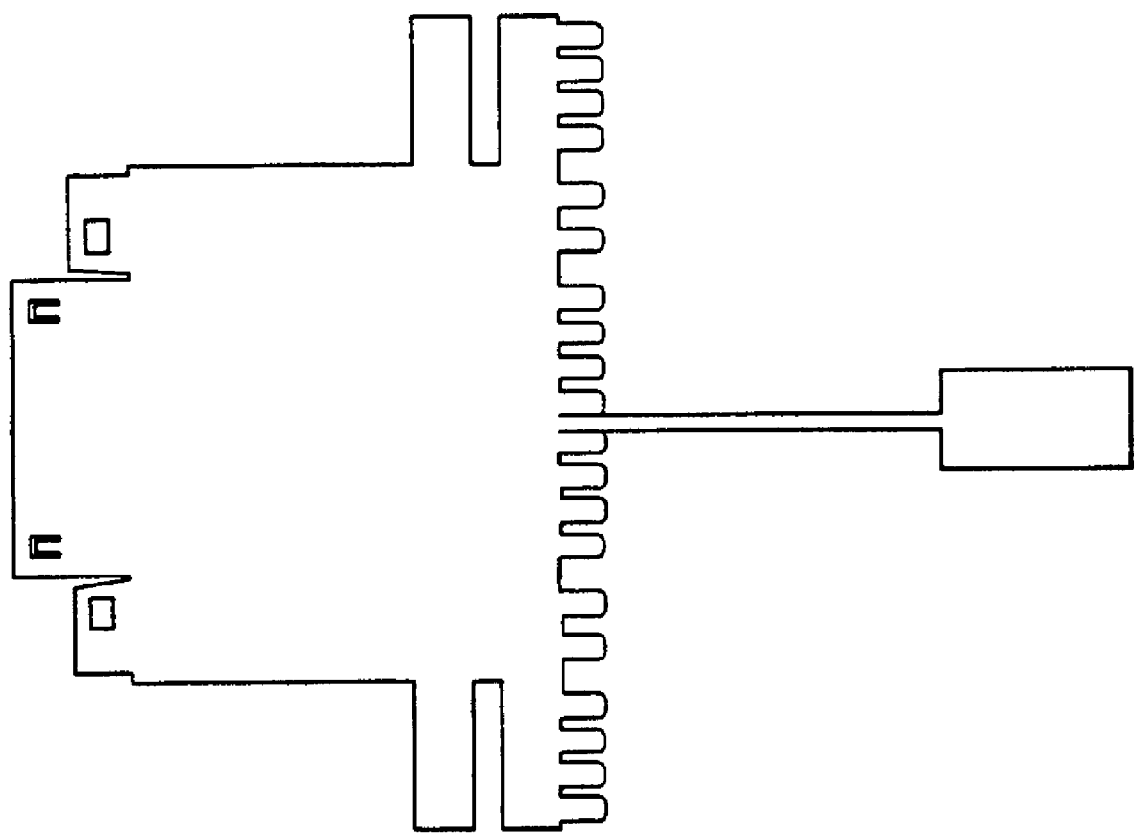
FIG. 23 is a top plan view of a third embodiment of our new design of a patterned material layer for a one-piece shielded housing, a bottom plan view being a mirror image and the patterned material layer being a thin and flat sheet so that only the top plan view need be shown.

Referring now to FIG. 16B, fold/bend lines are illustrated on the unfolded flat pattern layout 1600 to form the housing/shielding unit 715'. A slightly alternate pattern and alternate fold/bend lines can be utilized to form the housing/shielding unit 715. The fold/bend lines illustrated on the unfolded flat pattern layout 1600 make other features of the housing/shielding unit 715' discernable.

The fold/bend lines illustrated in FIG. 16B include left flap and right flap fold lines 1602L and 1602R, back flap fold line 1604, left and right tang fold lines 1605L and 1605R, retaining flap fold line 1606, left wing and right wing fold lines 1608L and 1608R, finger base bend line 1612B, finger tip bend line 1612T, left bottom flap and right bottom flap fold lines 1614L and 1614R, strap fold line 1616, septum fold line 1617. Generally, the folds along fold lines are made at nearly a ninety degree angle but for the fold lines of the tangs 114A and 114B and fingers.

A left wing 1620L and a right wing 1620R include window openings 1622L and 1622R respectively. The tangs 114A and 114B mate with the window openings 1622L and 1622R respectively to hold the left wing and right wing coupled to the back side 719' after folding.

The left wing fold line 1608L defines the left wing 1620L from the left side flap 717B. The right wing fold line 1608R defines the right wing 1620R from the right side flap 718B. The right side fold line 1602R and the right side slit 1611R defines right flaps 718A and 718B from the top side 716. The left side fold line 1602L and the left side slit 1611L defines left flaps 717A and 717B from the top side 716. The right bottom flap fold line 1614R defines the right bottom flap 910A'. The left bottom flap fold line 1614L defines the left bottom flap 910B'. The retaining flap fold line 1606 defines a retaining flap 1626 coupled to the back side flap 719'.

The fold/bend lines illustrated on the unfolded flat pattern layout 1600 are respectively folded and/or bent to form the housing/shielding unit 715' as illustrated in FIGS. 8B and 9B. The sequence of folding and bending of the fold lines in the unfolded flat pattern layout 1600 is similar to that of the unfolded flat pattern layout 1500 but for the fingers. The fingers 712 for the housing/shielding unit 715' or 715 are generally easier to push or pull out of the surface of the unfolded flat pattern layout 1600 first. Then, the sequence of folding and bending can proceed similarly for any of the three methods of assembly previously described.

Referring now to FIGS. 17A–17C, methods of assembly of the housing/shielding units 115 and 715 with the module chassis frame 120 is illustrated.

In FIG. 17A, the layout 1500 or 1600 are placed on top of the module chassis frame 120. Folding and bending is then performed around the module chassis frame 120 or 120' along the fold lines and bend lines described in FIGS.

15A–15B or 16A–16B respectively to form the housing/shielding unit 115, 115', 715 or 715'. The housing/shielding unit 115, 115', 715 or 715' then surrounds the module chassis frame 120 or 120'. The tangs 114A and 114B are then folded into the window openings 1522L and 1522R or 1622L and 1622R. This results in a substantially complete fiber-optic module such as fiber-optic module 100 illustrated in FIG. 1 for example.

In FIG. 17B, the layout 1500 or 1600 is first folded and bent along the fold lines and bend lines described in FIGS. 15A–15B or 16A–16B respectively but for fold lines 1516 and 1517 or 1616 and 1617. This leaves the front of the housing/shielding unit 115, 115', 715 or 715' open without the strap 710 and the septum 711 being folded. The module chassis frame 120 or 120' with the affixed components is inserted into the frontal opening with its rear entering first. Then the strap 210, 210' or 710 and the septum 411 or 711 are then folded fold lines 1516 and 1517 or 1616 and 1617 as described in FIGS. 15A–15B and FIGS. 16A–16B to hold the module chassis frame 120 or 120' within the housing/shielding unit 115, 115', 715 or 715'. After being folded, the septum 411 or 711 is affixed in place by being welded by spot welding, soldered with a solder, glued with an adhesive or otherwise fastened to a pair of bottom flaps. This results in a substantially complete fiber-optic module such as fiber-optic module 100 illustrated in FIG. 1 for example.

In FIG. 17C, the layout 1500 or 1600 is first folded and bent along the fold lines and bend lines described in FIGS. 15A–15B or 16A–16B respectively but for fold lines 1504, 1505L, 1505R, 1506, 1508L and 1508R or 1604, 1605L, 1605R, 1606, 1608L and 1608R. After being folded, the septum 411 or 711 is affixed in place by glue or welding. This leaves the rear of the housing/shielding unit 115, 115', 715 or 715' open without the back side flap 119' or 719' and the left and right wings 1520L or 1620L and 1520L or 1620R being folded. The front end of the module chassis frame 120 or 120' with the affixed components is inserted into the rear opening of the housing/shielding unit, nose first. The left and right wings 1620L and 1620R are then folded followed by back side flap 119' or 719' along fold lines 1504, 1506, 1508L and 1508R or 1604, 1606, 1608L and 1608R as shown and described in FIGS. 15A–15B or 16A–16B respectively. The tangs 114A and 114B are then folded along fold lines 1505L and 1505R or 1605L and 1605R into the openings 1522L and 1522R or 1622L and 1622R respectively. With the back side flap 119' or 719' held in place, the housing/shielding unit 115, 115', 715 or 715' is held around the module chassis frame 120 or 120'. This results in a substantially complete fiber-optic module such as fiber-optic module 100 illustrated in FIG. 1 for example.

The invention has many advantages over the prior art. One advantage of the invention is that a housing/shielding unit is used to reduce electromagnetic interference and increase noise immunity. Another advantage of the invention is that costs of manufacturing of fiber-optic modules can be reduced due to reduced component count. Another advantage of the invention is that only one finger need contact a grounded faceplate or bezel of a host system in order to ground the housing/shielding unit. Another advantage of the invention is a number of different assembly techniques may be used to assemble the housing/shielding unit with other components to form a fiber-optic module. Other advantages of the invention will become obvious to those of ordinary skill in the art after thoroughly reading this disclosure.

The preferred embodiments of the invention are thus described. While the invention has been described in particular embodiments, the invention should not be construed as limited by such embodiments. For example, the fiber-optic modules 100 and 700 have been described as having one or more pairs of a transmitter and a receiver for a fiber-optic transceiver module. However, the fiber-optic modules 100 and 700 may also have one or more transmitters only or one or more receivers only for a fiber-optic transmitter module or a fiber-optic receiver module. Rather, the invention should be construed according to the claims that follow below.

What is claimed is:

1. A method of assembling an opto-electronic module comprising:

forming a shielded housing with an open end, the shielded housing formed out of a sheet of conductive material to provide electromagnetic radiation shielding and protection of components, the shielded housing including one or more fingers to couple the shielded housing to ground;

assembling optical, electrical and optical-electrical components into a chassis to form a subassembly;

inserting the subassembly into the open end of the shielded housing, the shielded housing around the subassembly; and closing the open end of the shielded housing to hold the subassembly and the shielded housing assembled together including folding a strap and a septum of the shielded housing, the strap folded across the open end to strap the subassembly into the shielded housing, the septum folded into the open end to couple to the bottom side of the shielded housing to hold the subassembly strapped into the shielded housing.

2. The method of claim 1 wherein, the shielding housing is a one-piece shielding housing to protect components and to shield electromagnetic radiation.

3. The method of claim 1 wherein, the open end is a back side and the inserting includes inserting a front end of the subassembly into the open end of the back side of the shielded housing.

4. The method of claim 3 wherein, the closing of the open end of the back side includes folding a left side wing and a right side wing into the open end, and folding a back side flap down over the open end to couple to he left side wing and the right side wing.

5. The method of claim 1 wherein, the open end is a front side and the inserting includes inserting a rear end of the subassembly into the open end of the front side of the shielded housing.

6. The method of claim 1 wherein, the forming of the shielded housing includes stamping a pattern of the shielded housing into the sheet of conductive material, the pattern including the one or more fingers near an edge of the flat sheet, folding the sheet of conductive material along a plurality of fold lines into a multi-sided rectangularly shaped container but for the open end, and bending the one or more fingers into shape.

7. A method to assemble an EMI shielding module comprising:

forming a plurality of substantially equidistant spring fingers along an edge of a flat sheet;

forming a strap at the edge of the flat sheet and a septum on the end of the strap;

forming a pair of bottom flaps in the flat sheet;

folding the flat sheet along axes to form a container substantially in the shape of rectangular box, the rectangular box having a first end and a second end, the first end having the plurality of finger along each of a plurality of edges and an opening for cable connectors, the second end having a backside flap;

folding the strap across the opening for cable connectors; and coupling the septum to inner surfaces of the bottom flaps to hold the strap across the opening.

8. The method of claim 7 wherein, the EMI shielding module is a one-piece shielded housing to protect components and to shield electromagnetic radiation.

9. The method of claim 7 wherein, the EMI shielding module encloses a module chassis frame, the module chassis frame being a central structural support to which one or more optical, electrical and optical-electrical components used in transmission and reception of optical signals are attached.

10. A method to assemble an optical transmitter and/or receiver, the method comprising:

forming a plurality of fingers, a strap, and a septum along a first edge of a conductive sheet;

placing the conductive sheet on a module chassis frame, the module chassis frame having a plurality of components used in transmitting and/or receiving optical signals;

folding the conductive sheet around the module chassis frame such that the conductive sheet substantially encloses the module chassis frame but for a frontal opening adjacent to the first edge; and bending the strap and the septum around a front end of the module chassis frame to hold the folded conductive sheet and the module chassis frame together.

11. The method of claim 10 wherein, the fingers to electrically ground the folded conductive sheet to a ground of a host system.

12. The method of claim 10 wherein, the conductive sheet is one of metal, conductive plastic, and plated plastic.

13. The method of claim 10 further comprising:

bending the plurality of fingers outward from the frontal opening.

14. The method of claim 10 further comprising:

lifting the plurality of fingers up from an outer surface of the conductive sheet.

* * * * *